United States Patent [19]
Aoyama

[11] Patent Number: 5,887,200
[45] Date of Patent: Mar. 23, 1999

[54] LINE OF SIGHT DETECTION DEVICE AND APPARATUS HAVING THE LINE OF SIGHT DETECTION DEVICE

[75] Inventor: Keisuke Aoyama, Kawasaki, Japan

[73] Assignee: Canon Kabushiki Kaisha, Tokyo, Japan

[21] Appl. No.: 972,357

[22] Filed: Nov. 18, 1997

Related U.S. Application Data

[63] Continuation of Ser. No. 689,020, Jul. 30, 1996, abandoned.

[30] Foreign Application Priority Data

Jul. 31, 1995 [JP] Japan ................................. 7-212971
Jul. 31, 1995 [JP] Japan ................................. 7-212974

[51] Int. Cl.$^6$ ................................................. G03B 17/00
[52] U.S. Cl. ................................................. 396/50; 396/51
[58] Field of Search ........................................ 396/51, 50

[56] References Cited

U.S. PATENT DOCUMENTS

| | | | |
|---|---|---|---|
| 5,428,413 | 6/1995 | Shindo | 396/51 |
| 5,485,241 | 1/1996 | Irie et al. | 354/410 |
| 5,486,892 | 1/1996 | Suzuki et al. | 354/402 |
| 5,570,158 | 10/1996 | Wakabayashi et al. | 396/51 |
| 5,579,079 | 11/1996 | Yamada et al. | 396/51 |
| 5,598,243 | 1/1997 | Takagi | 396/51 |

*Primary Examiner*—Russell Adams
*Attorney, Agent, or Firm*—Fitzpatrick, Cella, Harper & Scinto

[57] ABSTRACT

A line of sight detection device for detecting a line of sight of a user by using personal data of the user includes a personal data obtaining device for obtaining personal data related to the line of sight of the user, an attitude detection device for detecting an attitude of the device, a memory for storing the attitude of the device detected by the attitude detection device, the memory storing the attitude of the line of sight detection device at a time when the personal data obtaining device starts an obtaining operation of the personal data, and a determination device for comparing the attitude of the line of sight detection device stored in the memory with the attitude of the device during the obtaining operation for the personal data by the personal data obtaining device, and for outputting information indicative of a failure of the obtaining operation of the personal data when the compared attitudes of the device are different from each other.

35 Claims, 21 Drawing Sheets

FIG. 2
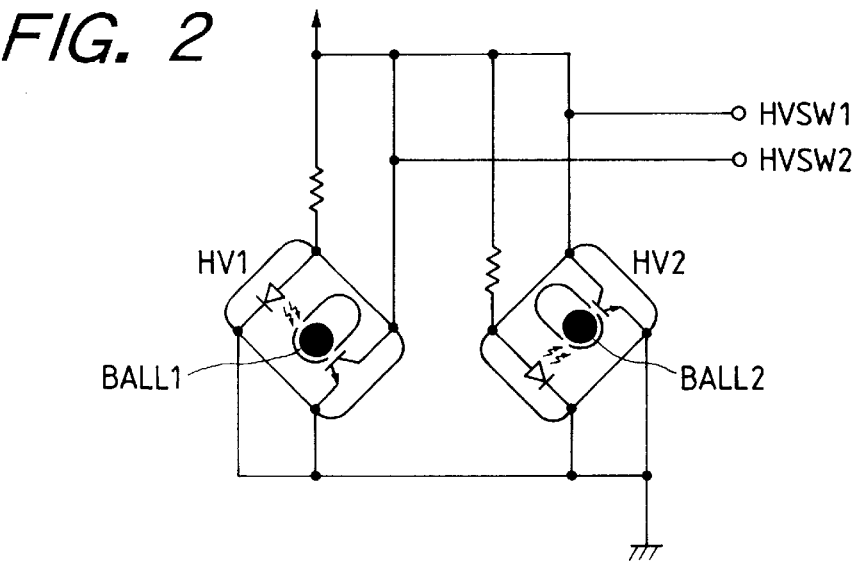
FIG. 3A1   FIG. 3B1   FIG. 3C1
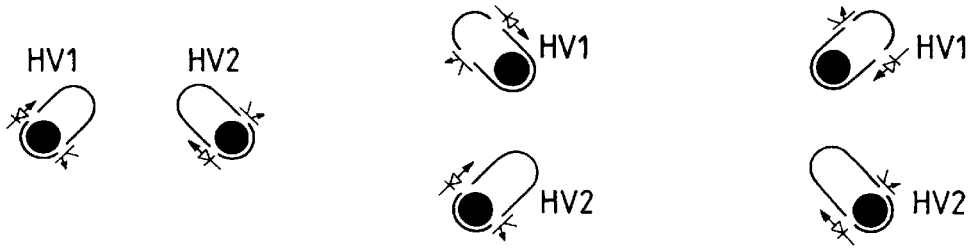
FIG. 3A2   FIG. 3B2   FIG. 3C2
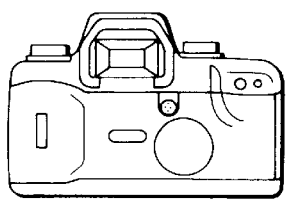 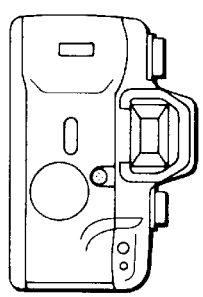 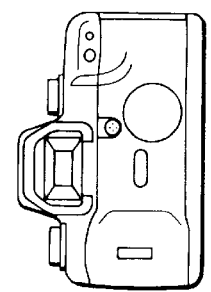

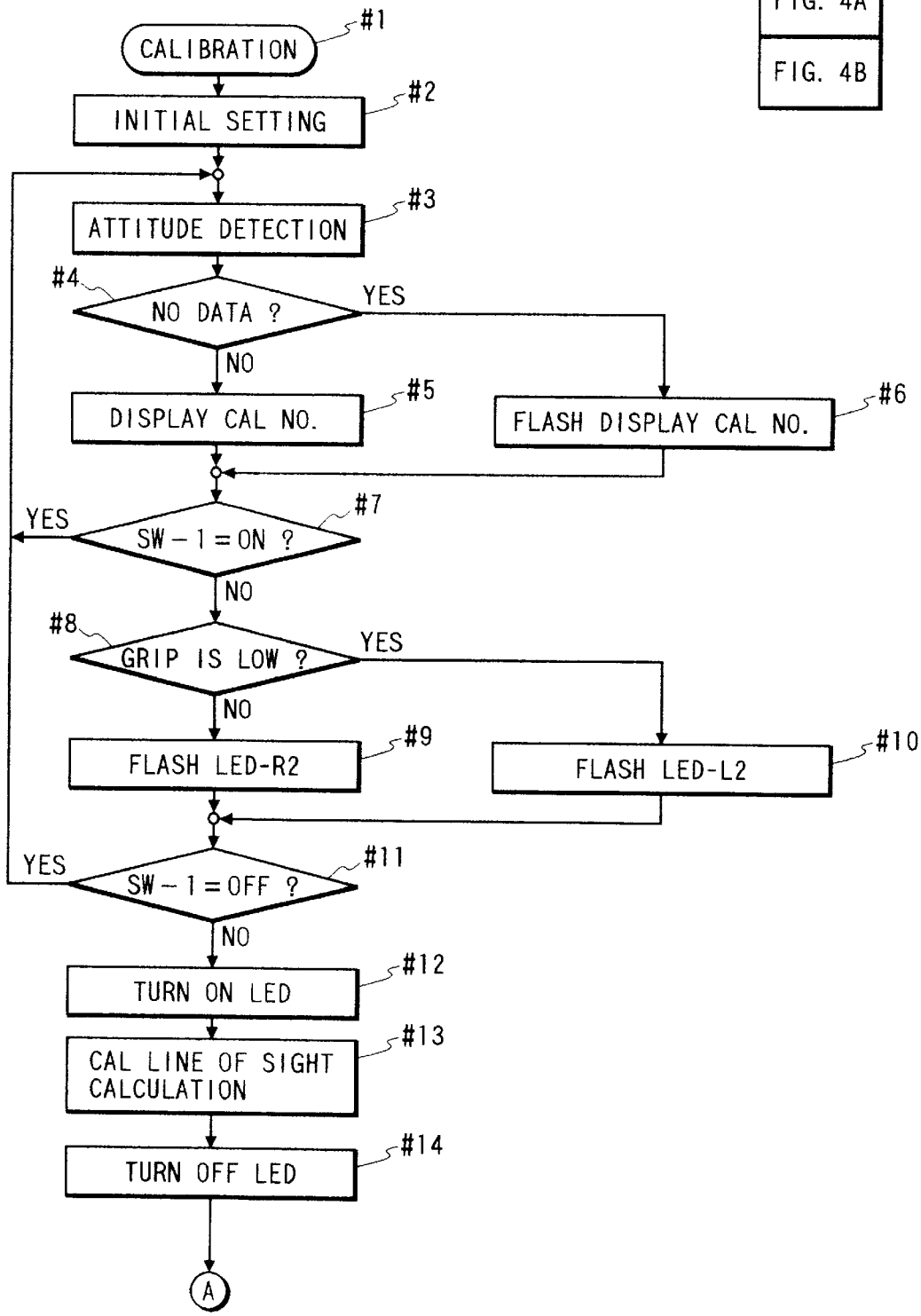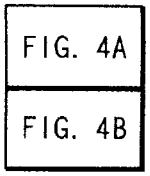

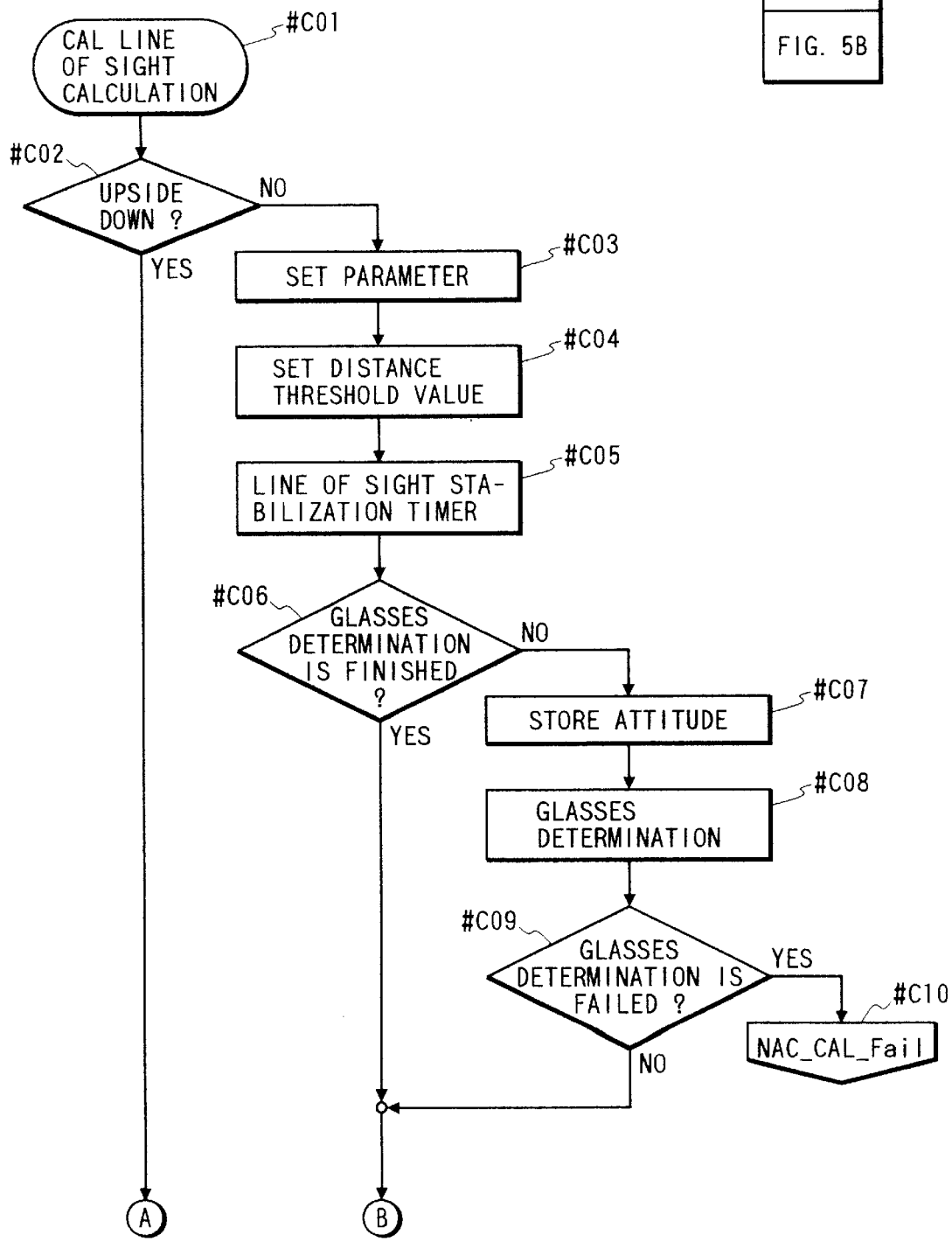

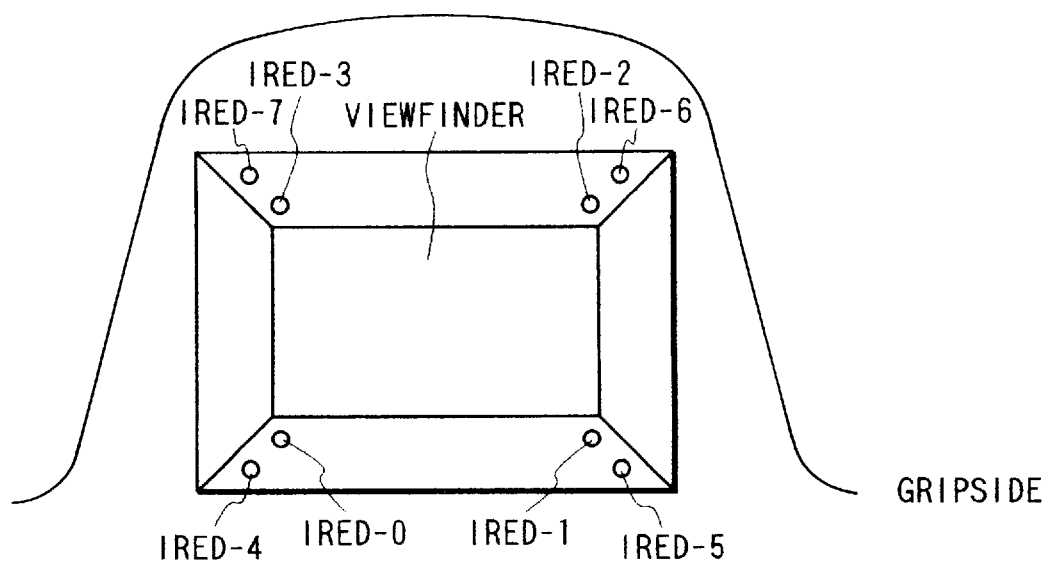

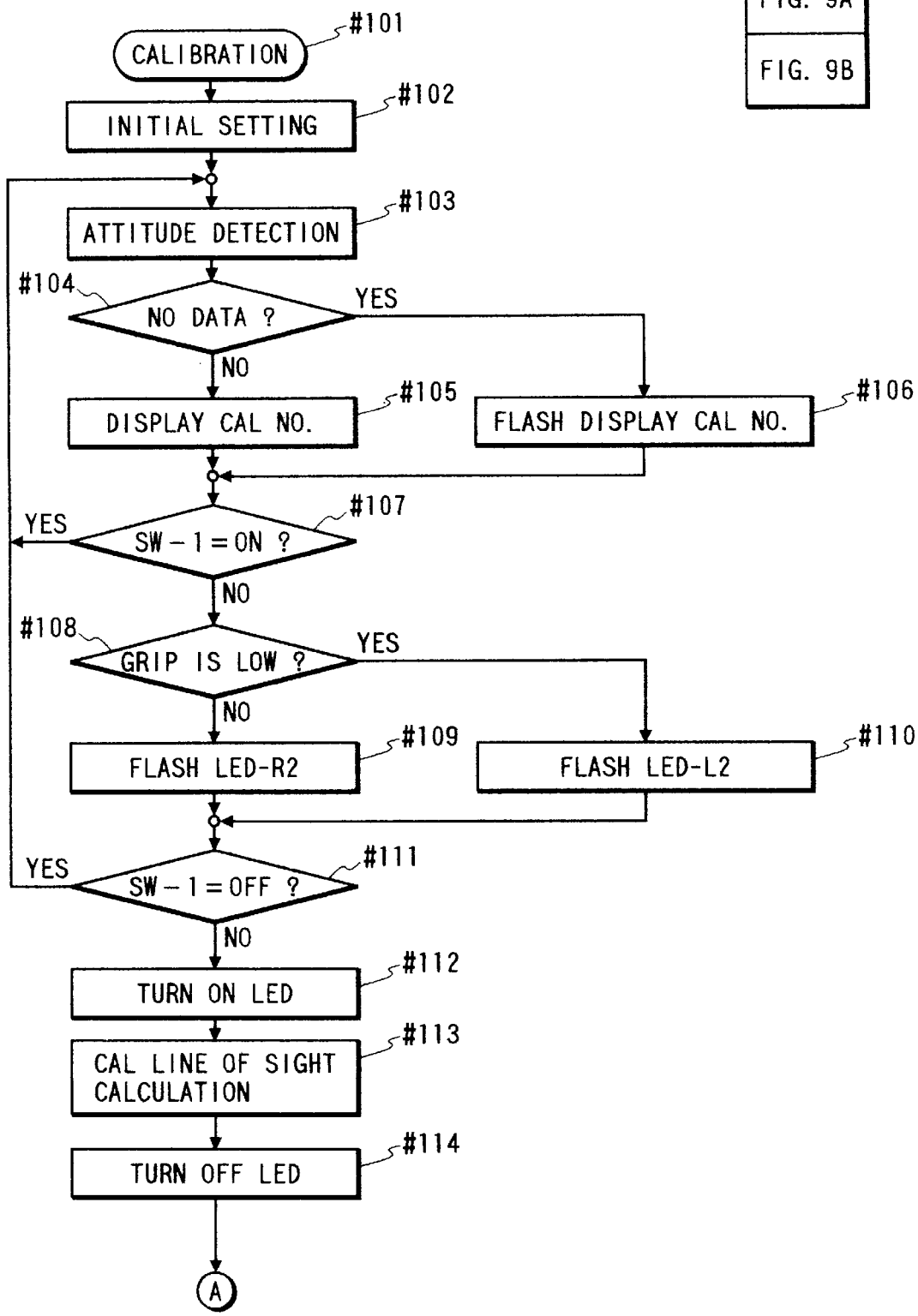

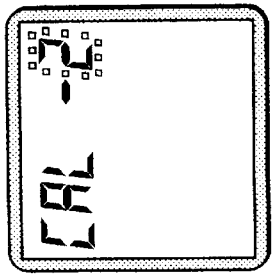
FIG. 11C1
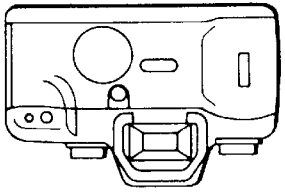
FIG. 11C2
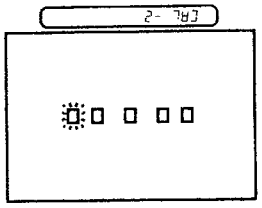
FIG. 11C3
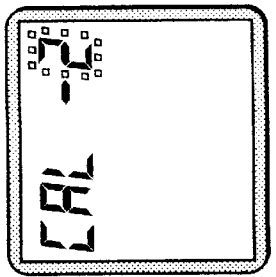
FIG. 11B1
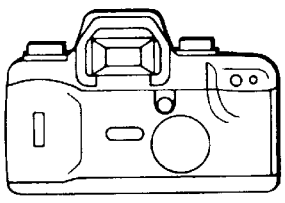
FIG. 11B2
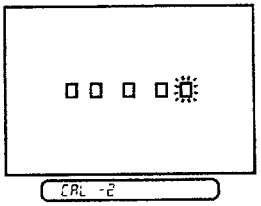
FIG. 11B3
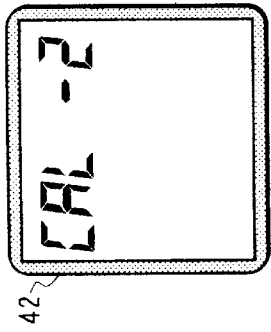
FIG. 11A1
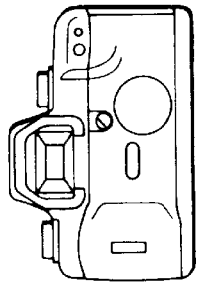
FIG. 11A2
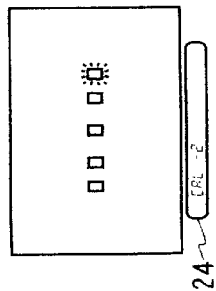
FIG. 11A3

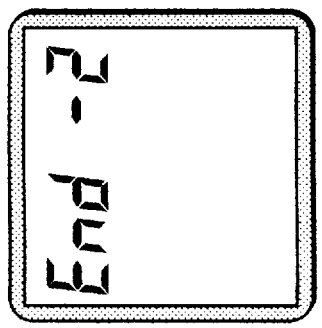
FIG. 12C1
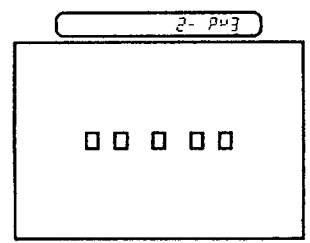
FIG. 12C2
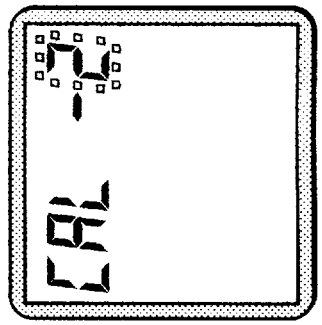
FIG. 12B1
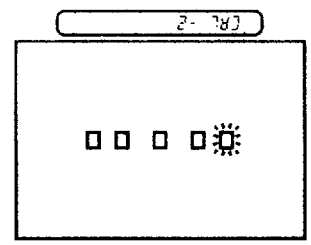
FIG. 12B2
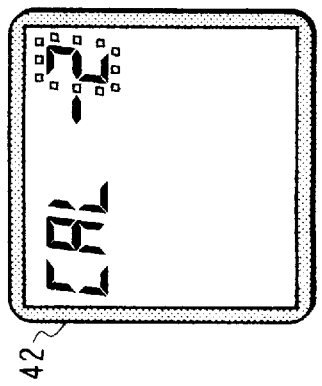
FIG. 12A1
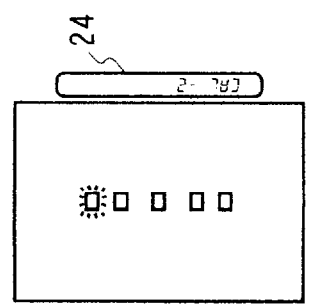
FIG. 12A2

FIG. 18A1
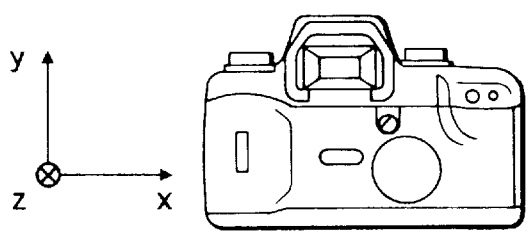
FIG. 18A2
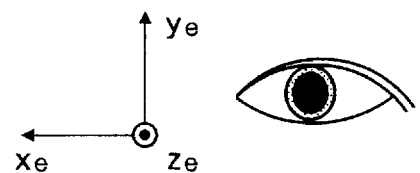
FIG. 18B1
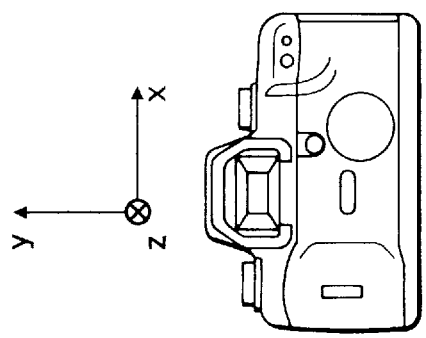
FIG. 18B2
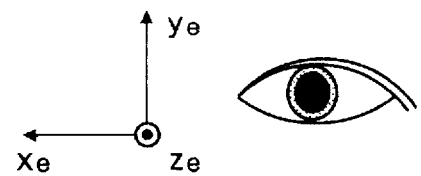
FIG. 18C1
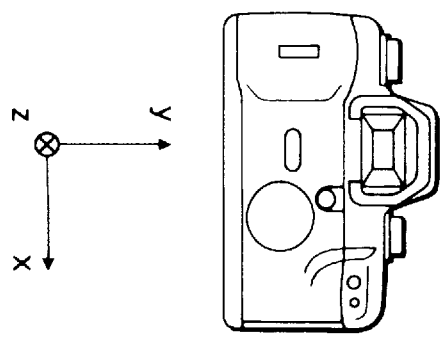
FIG. 18C2
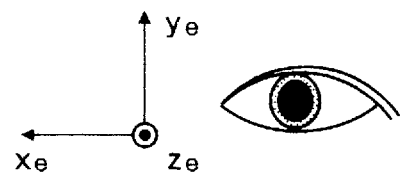

LINE OF SIGHT DETECTION DEVICE AND APPARATUS HAVING THE LINE OF SIGHT DETECTION DEVICE

This application is a continuation of application No. 08/689,020, filed Jul. 30, 1996, now abandoned.

BACKGROUND OF THE INVENTION

1. Field of the Invention

The present invention relates to a line of sight detection device for detecting a line of sight of a user based on personal data related to an eyeball of the user, and to an apparatus having the line of sight detection device.

2. Related Background Art

Conventionally, there have been provided several types of devices (apparatuses) for detecting which position on a plane of observation a user or photographer looks at, i.e., for detecting a line of sight (visual axis) of the photographer, such as an eye camera. For example, in U.S. patent application No. 08/331,154, filed on Oct. 28, 1994, an observation point on which a photographer's gaze is fixed is obtained based on a cornea reflection image and an image focusing position of a pupil both detected by projecting parallel rays of light from a light source onto a front portion of the eyeball of the photographer. The same application also discloses an example of a single-lens reflex camera with an observation point detection device in which an automatic focus control of a photo-taking lens is performed by using information indicative of an observation point of the photographer.

FIG. 19 is a diagram explaining how a line of sight of a photographer is detected.

In FIG. 19, there are shown an eyeball 15, a cornea 16 and an iris 17 of the photographer. Referring now to the drawing, a method for detecting a line of sight of the photographer will be described.

At first, a beam of infrared light emitted from a light source 13b is applied to the cornea 16 of the photographer's eyeball 15 so that a cornea reflection image (virtual image) d can be formed by a portion of the infrared light reflected on the cornea 16. The cornea reflection image d is then converged on a light-receiving lens 12 and the converged image is focused at a position d' on an image sensor 14. Similarly, a beam of infrared light emitted from a light source 13a is applied to the cornea 16 of the eyeball 15 so that a cornea reflection image e can be formed by a portion of the infrared light reflected on the cornea 16. The cornea reflection image e is then converged on the light-receiving lens 12 and the converged image is focused at position e' on the image sensor 14.

On the other hand, beams from the ends a, b of the iris 17 are converged through the light-receiving lens 12 on the image sensor 14 so that images of the beams can be focused at positions a', b' on the image sensor 14, respectively. When the eyeball 15 has an optical axis of a small rotation angle θ to be rotated with respect to the optical axis of the light-receiving lens 12, if x-coordinates of the ends a, b of the iris 17 are xa, xb, respectively, the center point c of the pupil 19 has an x-coordinate xc represented as:

$$xc=(xa+xb)/2.$$

Further, an x-coordinate of a midpoint between the cornea reflection images d, e substantially corresponds to an x-coordinate xo of the center of cornea curvature. For this reason, if x-coordinates of the positions d, e at which the cornea reflection images are generated are xd, xe, respectively, and a standard distance between the center o of the cornea curvature and the center c of the pupil 19 is OC, a rotation angle θx of the optical axis 15a of the eyeball 15 can meet the following relationship:

$$OC^*\sin\theta x=(xd+xe)/2-xc. \tag{1}$$

Thus, the rotation angle θ of the optical axis 15a of the eyeball 15 can be obtained by detecting the positions of respective characteristics of the eyeball 15 (the cornea reflection images and the center of the pupil) projected on the image sensor 14.

In other words, the rotation angle of the optical axis 15a of the eyeball 15 is obtained from the equation (1) as follows:

$$\beta^*OC^*\sin\theta x\{(x_{po}-\delta x)-x_{ic}\}^*\text{pitch}, \tag{2}$$

and, $$\beta^*OC^*\sin\theta y\{(y_{po}-\delta y)-y_{ic}\}^*\text{pitch}, \tag{3}$$

where θx is a rotation angle to rotate the optical axis of the eyeball on a z-x plane, θy is a rotation angle to rotate the optical axis of the eyeball on a y-z plane, $(x_{po}, y_{po})$ are coordinates of the midpoint between the two cornea reflection images formed on the image sensor 14, $(x_{ic}, y_{ic})$ are coordinates of the center of the pupil taken on the image sensor 14, and pitch is a pitch between pixels on the image sensor 14. Further, β is a focusing magnification which is determined based on the relative position of the eyeball 15 to the light-receiving lens 12 and factually obtained as a function of a gap between the two cornea reflection images.

δx, δy are correction terms for correcting an error of the coordinates of the midpoint between the cornea reflection images, the error produced when the eyeball of the photographer is illuminated with divergent rays instead of parallel rays. δy also includes a correction term for correcting offset components produced by illuminating the eyeball of the photographer with the divergent rays from the lower eyelid side.

Next, an observation point on which the photographer's gaze is fixed is obtained from a relationship between the rotation angle of the eyeball and coordinates of the observation point. When the rotation angle of the optical axis of the photographer's eyeball is represented in coordinates (θx, θy), if the attitude of the camera is in a lateral posture, the photographer's observation point (x, y) on a plane of observation is obtained as follows:

$$x=m^*(\theta x+\Delta), \tag{4}$$

and, $$y=m^*\theta y, \tag{5}$$

where an x direction and a y direction denote a horizontal direction and a vertical direction for the photographer, respectively, when the camera takes the lateral posture. Also, m is a coefficient of transformation for transforming the rotation angle of the eyeball into coordinates on a focusing plate, and Δ is an angle between the optical axis 15a of the eyeball 15 and the visual axis (observation point). Since there are differences between individuals in the coefficients of transformation m and Δ, personal difference correction data for correcting personal differences needs to be predetermined in the form of data inclusive of these coefficients of transformation.

The personal difference correction data can be calculated for each photographer by detecting a rotation angle of the optical axis of the eyeball when the photographer looks at a given plane of coordinates. The detecting operation for obtaining the personal difference correction data is called calibration, and the personal difference correction data obtained by the calibration is called calibration data.

When a photographer looks at points on a plane of observation, the points having coordinates (x1, 0) and (x2, 0), if the rotation angles of the photographer's eyeball are represented in coordinates (θx1, 0) and (θx2, 0), respectively, the personal difference data can be obtained from the following equations:

$$m=(x1-x2)/(\theta x1-\theta x2), \tag{6}$$

and, $$\Delta=(x2 \cdot \theta x1 - x1 \cdot \theta x2)/(x1-x2). \tag{7}$$

The input of the personal difference data is performed in all postures of the camera such as in a posture in which the line of sight detection is not required. For example, since no photographer takes a picture with the camera turned upside down, the personal difference correction data cannot be input in a condition that the camera is turned upside down. Further, when the camera has such a hardware structure as the line of sight detection is prohibited when the camera takes a vertical posture, the personal difference data cannot be input in the vertical posture. Up to this time, various approaches to calibration have been proposed, such as a calibration process of keeping vertical and lateral calibration data, as disclosed in U.S. patent application No. 08/408,281, filed on Mar. 22, 1995. As to the relationship between the vertical and lateral postures, various proposals have been also made, such as a mechanism for prohibiting line of sight detection in the vertical posture and turning off an indication lamp, as disclosed in U.S. patent application No. 08/541,722, filed on Oct. 10, 1995, and a mechanism for changing lighting after detecting the attitude, as disclosed in U.S. patent application No. 08/386,200, filed on Feb. 9, 1995.

Such a line of sight detection device usable in vertical postures as well as in the lateral posture, however, cannot be expected to obtain an adequate accuracy in the vertical postures because the device uses the coefficients of personal differences related to the lateral posture. In the case that the line of sight detection device is used in the lateral posture, horizontal and vertical directions for the device correspond to those for the photographer, respectively. For this reason, the above conventional examples do not divide the coordinate system into a man coordinate system and a camera coordinate system. To clarify the discrimination between both coordinate systems, the man coordinate system is represented by adding e. FIG. 17 is a perspective view showing the man and camera coordinate systems when the camera is held in the lateral posture.

In the man coordinate system, the rotation angle of the eyeball is $(\theta x_e, \theta y_e)$. The rotation angle is transformed into the camera coordinate system as follows:

for the lateral posture, $(\theta x_e, \theta y_e) \rightarrow (\theta x, \theta y)$ (see FIGS. 18A1 and 18A2), for a vertical posture with the right side of the camera turned up, $(\theta x_e, \theta y_e) \rightarrow (-\theta y, +\theta x)$ (see FIGS. 18B1 and 18B2), and, for a vertical posture with the right side of the camera turned down, $(\theta x_e, \theta y_e) \rightarrow (+\theta y, -\theta x)$ (see FIGS. 18C1 and 18C2).

When using the line of sight detection device as a standard for the plane of coordinates on which the photographer's gaze is fixed, a vertical direction for the photographer corresponds to the lateral direction for the line of sight detection device. Further, when taking into account that the coefficients of correction m and Δ are determined for each eyeball of persons, the above equations (4) and (5) can be represented as:

$$x=m_x \cdot (\theta x + \Delta_x), \tag{4'}$$

and, $$y=m_y \cdot (\theta y + \Delta_y). \tag{5'}$$

Since the values of $m_x$, $\Delta_x$, $m_y$ and $\Delta_y$ vary with the attitude of the camera, the calibration needs to be performed in each attitude of the camera for obtaining the personal difference correction data. Alternatively, other coefficients of transformation obtained in a corresponding attitude of another camera can be used for calibration in the attitude of the camera in which a line of sight of the photographer should be detected. As shown in the conventional examples, when the calibration is performed by assigning the observation point only to the x direction in the camera coordinate system, although the calculation is easier, strictly speaking, such calibration results in obtaining only the values of $m_x$, $\Delta_x$ in the above equation (4'). When using such a calibrating method, it is required to perform calibration in the vertical posture so that the values of $m_y$, $\Delta_y$ in the above equation (5') can be obtained. In other words, all the coefficients of transformation cannot be calculated unless the calibration in both postures is performed.

SUMMARY OF THE INVENTION

One aspect of the present invention is to provide a line of sight detection device for detecting a line of sight of a user by using personal data of the user, including personal data obtaining means for obtaining the personal data related to the line of sight of the user; attitude detection means for detecting an attitude of the device; memory means for storing the attitude of said device at a time when said personal data obtaining means starts an obtaining operation of said personal data; and determination means for comparing the attitude of said device stored in said memory means with the attitude of said device during the obtaining operation for said personal data by said personal data obtaining means, and for outputting information indicative of a failure of the obtaining operation of said personal data when the compared attitudes of said device are different from each other, whereby an error in obtaining the personal data can be prevented, the error caused by a change in attitude of said device during the obtaining operation for said personal data.

The other aspect of the present invention is to provide a line of sight detection device for detecting a line of sight of a user by using personal data of the user, including attitude detection means for detecting an attitude of the device; personal data obtaining means for obtaining the personal data related to the line of sight of said user in accordance with the attitude of said device; memory means for storing the personal data for every attitude of said device, the personal data obtained by said personal data obtaining means; display means for displaying information indicative of the presence of said personal data stored in said memory means and the attitude of said device corresponding to said personal data, whereby said user can easily understand the relationship between said personal data and the attitude of said device.

BRIEF DESCRIPTION OF DRAWINGS

By way of example and to make the description more clear, reference is made to the accompanying drawings in which:

FIG. 2 is a circuit diagram showing a structure of an attitude detection circuit in FIG. 1;

FIGS. 3A1 to 3C2 are descriptive diagrams showing states of attitude detection sensors when the camera is held in different postures;

FIG. 7 is a partial diagram showing an arrangement of eyeball lighting IREDs to be provided in the camera according to the preferred embodiments of the present invention;

FIGS. 11A1 to 11C3 are diagrams explaining the third embodiment of the present invention, each using the camera in FIG. 1 for exhibiting a relationship among an attitude of the camera, indication of a calibration number and display of the view finder;

FIGS. 12A1 to 12C2 are diagrams explaining the third embodiment of the present invention, each using the camera in FIG. 1 for showing a display during a calibrating operation in a vertical posture with the grip position of the camera being up;

FIGS. 18A1 to 18C2 are diagrams showing a relationship between the man and camera coordinate systems in each attitude of the camera.

DETAILED DESCRIPTION OF THE PREFERRED EMBODIMENTS

Figure 1:
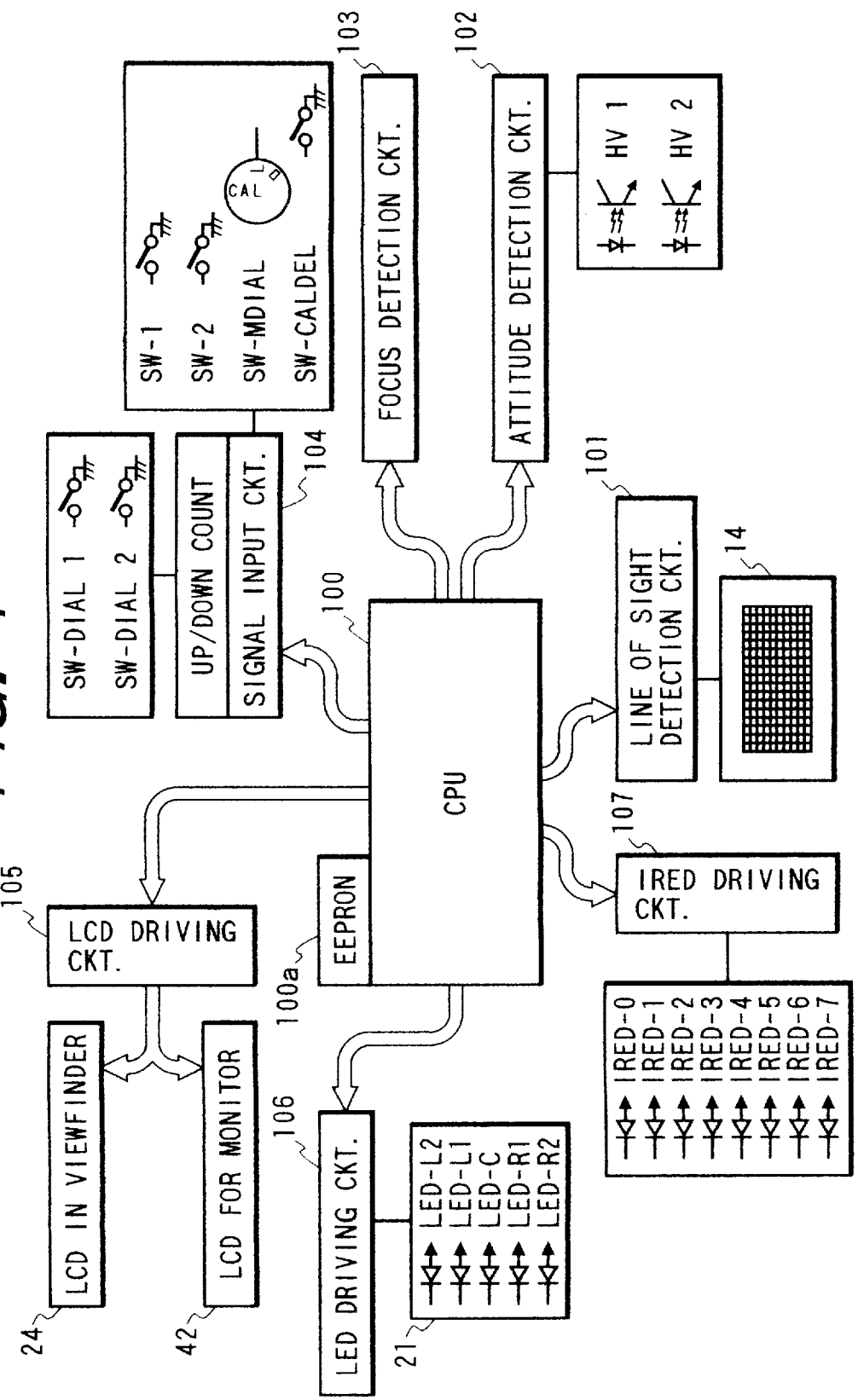
FIG. 1 is a block diagram showing the main part of an electric circuit network built in a camera according to preferred embodiments of the present invention.

Referring now to the drawings, preferred embodiments of the present invention will be described in detail hereinbelow.

FIG. 1 is a block diagram showing the main part of an electric circuit network built in a camera body according to the preferred embodiments of the present invention.

In the drawing, a central processing unit 100 (hereinbelow, referred to as a CPU) of a microcomputer which is built in the camera body as a camera controller is connected to a line of sight detection circuit 101, an attitude detection circuit 102, an automatic focus detection circuit 103, a signal input circuit 104, an LCD driving circuit 105, an LED driving circuit 106, and an IRED driving circuit 107. Further, the CPU 100 sends and receives signals through mount contacts to and from an unillustrated focus control circuit and an aperture driving circuit both mounted inside a photo-taking lens.

An EEPROM 100a included in the CPU 100 as a storage is used to store not only film counts and other photographic information, but also personal difference correction data obtained as a result of calibration.

The line of sight detection circuit 101 sends the CPU 100 an output of an eyeball image supplied from an image sensor (CCD-EYE) 14. The CPU 100 performs analog-to-digital (A/D) conversion of an eyeball image signal through A/D conversion means incorporated in the CPU 100. Then, characteristics of the eyeball image needed for line of sight detection are extracted from the converted image information according to a predetermined algorithm so that a rotation angle of the photographer's eyeball can be calculated from the positions of the extracted characteristics.

The attitude detection circuit 102 is constituted of plural pairs of photosensors and LEDs (HV1, HV2), and shielding objects movable by gravity, in which the shielding objects are moved by gravity to change the output of the photosensors HV1, HV2 so that an attitude of the camera can be detected.

FIG. 2 is a circuit diagram of the attitude detection circuit 102.

In FIG. 2, the photosensors HV1, HV2 are placed 90 degrees to each other and each has a certain angle from the horizontal axis. In this case, although LED outputs of both sensors are shielded by the shielding objects (BALL 1, BALL 2) when the sensors are arranged horizontally, the attitude sensors are not limited by such a positioning structure.

Referring next to FIG. 3, a description will be made to the attitude detection outputs in different postures.

FIGS. 3A1 and 3A2 show a case that the camera is in the lateral posture, in which both the photosensors HV1, HV2 are OFF-state and outputs of the photosensors HV1, HV2 are HVSW1="H", HVSW2="H", respectively. FIGS. 3B1 and 3B2 show a case that the camera is in a vertical posture with the grip position being down, in which the shielding object BALL 1 of the photosensor HV1 is moved to turn the photosensor HV1 ON. In this case, the outputs of the photosensors HV1, HV2 are HVSW1="L", HVSW2="H", respectively. In contrast, FIGS. 3C1 and 3C2 show a case that the shielding object BALL 2 of the photosensor HV2 is moved to turn the photosensor HV2 ON, and therefore, the outputs of the photosensors HV1, HV2 become HVSW1="H", HVSW2="L", respectively. When the camera is turned upside down, although the case is not illustrated herein, the outputs of the photosensors HV1, HV2 become HVSW1="L", HVSW2="L", respectively.

As such above, the attitude of the camera can be detected from the outputs of the HVSW1, HVSW2.

Returning to FIG. 1, the automatic focus detection circuit 103 sends the CPU 100 photo-electric converted voltages supplied from a plurality of line sensors. The CPU 100 performs analog-to-digital (A/D) conversion of line sensor signals one by one through A/D conversion means incorporated in the CPU 100, then, performs a predetermined arithmetic operation so that a focal point can be detected.

Figure 8B:
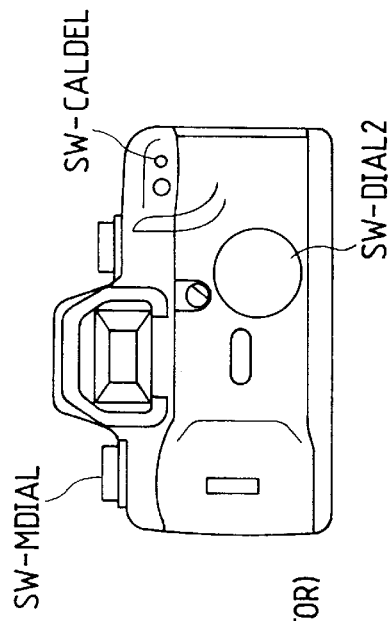
FIGS. 8A to 8D are diagrams explaining a third embodiment of the present invention, which use the camera in FIG. 1 for showing operation members of the camera, light sources for line of sight detection and display of a view finder, respectively.
Figure 8A:
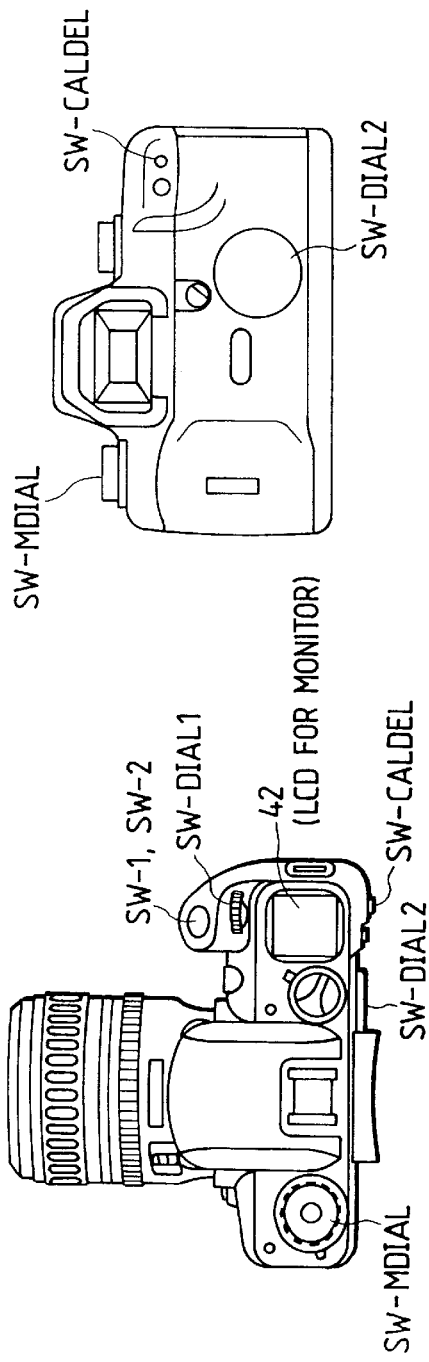

The signal input circuit 104 inputs signals supplied from all kinds of switches, and generates an interrupt signal to the CPU 100 in response to a change in state of a switch. In such switches, a switch SW-1 is turned ON by a first stroke of a release button and operative to start photometry, AF and line of sight detection; a release switch SW-2 is turned ON by a second stroke of the release button; and a mode dial SW-MDIAL is provided for selecting not only all kinds of photo-modes of the camera, but also a calibration mode or a lock position of the camera (see FIGS. 8A and 8B). A switch SW-CALDEL is provided for deleting personal difference correction data. Represented by SW-DIAL1, SW-DIAL2 are electric dial switches, and electric signals supplied therefrom are input to an UP/DOWN counter so that the clicking amount to turn each dial can be counted. The SW-DIAL1 is placed between the switches SW-1, SW-2 and an LCD 42 for a monitor, and this allows an operator to operate it by the forefinger of the right hand (see FIG. 8A). On the other hand, the SW-DIAL2 is placed on the back side of the camera so that the operator can operate it by the thumb of the right hand (see FIG. 8B).

Figure 8D:
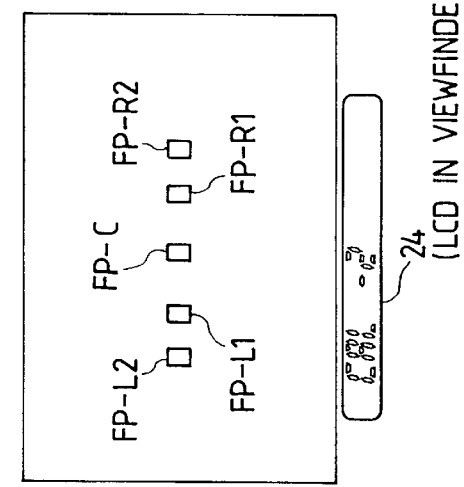

The LCD driving circuit 105 drives not only an LCD 24 in a view finder (see FIG. 8D) and the LCD 42 for monitor (see FIG. 8A) to display all kinds of information, but also an unillustrated buzzer to generate a buzzer tone.

The LED driving circuit 106 turns on LEDs 21 (LED-L2, LED-L1, LED-C, LED-R1, LED-R2) for superimposed lighting of distance measuring points (focus detecting points) on the display of the view finder. These LEDs 21, i.e., LED-L2, LED-L1, LED-C, LED-R1 and LED-R2, correspond to distance measuring (focal point detecting) marks provided inside the view finder, i.e., marks FP-L2, FP-L1, FP-C, FP-R1 and FP-R2. Thus, the focal point detecting marks in the view finder can be lighted up by turning on the LEDs 21 (see FIG. 8D).

The IRED driving circuit 107 turns on infrared LEDs (IRED-0, IRED-1, IRED-2, IRED-3, IRED-4, IRED-5, IRED-6 and IRED-7) for illuminating an eyeball of the photographer with infrared rays. The circuit 107 is provided with a circuit for preventing overload current and a safety circuit for preventing an accident caused when the circuit is energized for a long time. The IREDs work in pairs for lighting the eyeball from the lower side.

Figure 8C:
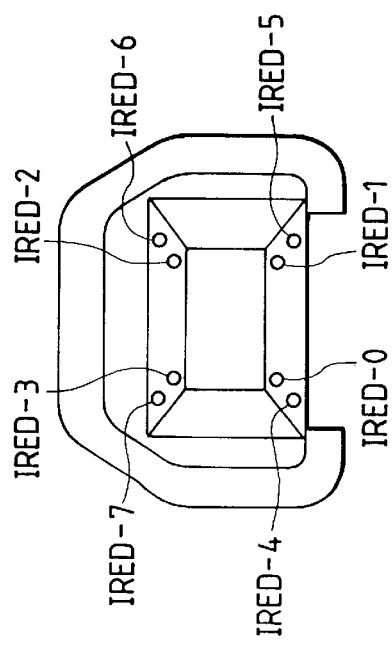

Specifically, a pair of IRED-0, IRED-1 or IRED-4, IRED-5 is used in the lateral posture, a pair of IRED-3, IRED-0 or IRED-7, IRED-4 is used in a vertical posture with the grip position being up (i.e., with the right side of the camera turned up as seen from the view finder side), and a pair of IRED-1, IRED-2 or IRED-5, IRED-6 is used in a vertical posture with the grip position being down (i.e., with the right side of the camera turned down as seen from the view finder side) (see FIG. 8C). It is determined which pair of IREDs is used as follows: a closely spaced IRED pair is used in any posture for lighting a naked-eye, while a widely spaced IRED pair is used in any posture for lighting an eyeball of a photographer who wears glasses or for lighting an eyeball put apart from the view finder.

The line of sight detection device and a personal difference data obtaining means according to the present invention are constituted of the CPU 100, the line of sight detection device 101, the IRED driving circuit 107, the image sensor 14, the LCD driving circuit 105, the LED driving circuit 106, and eyeball rotation angle detection means. The eyeball rotation angle detection means is an internal program stored in the CPU 100. The CPU 100 controls each functional element of the line of sight detection device by sending signals thereto, and further, it processes signals received from all kinds of detection circuits.

An attitude detection means according to the present invention is constituted of the attitude detection circuit 102 and a pair of a photosensor and an LED (HV1, HV2). Further, a memory means is a RAM in the CPU 100, and a personal difference data determination means is realized by a program written in the CPU 100.

Figure 4B:
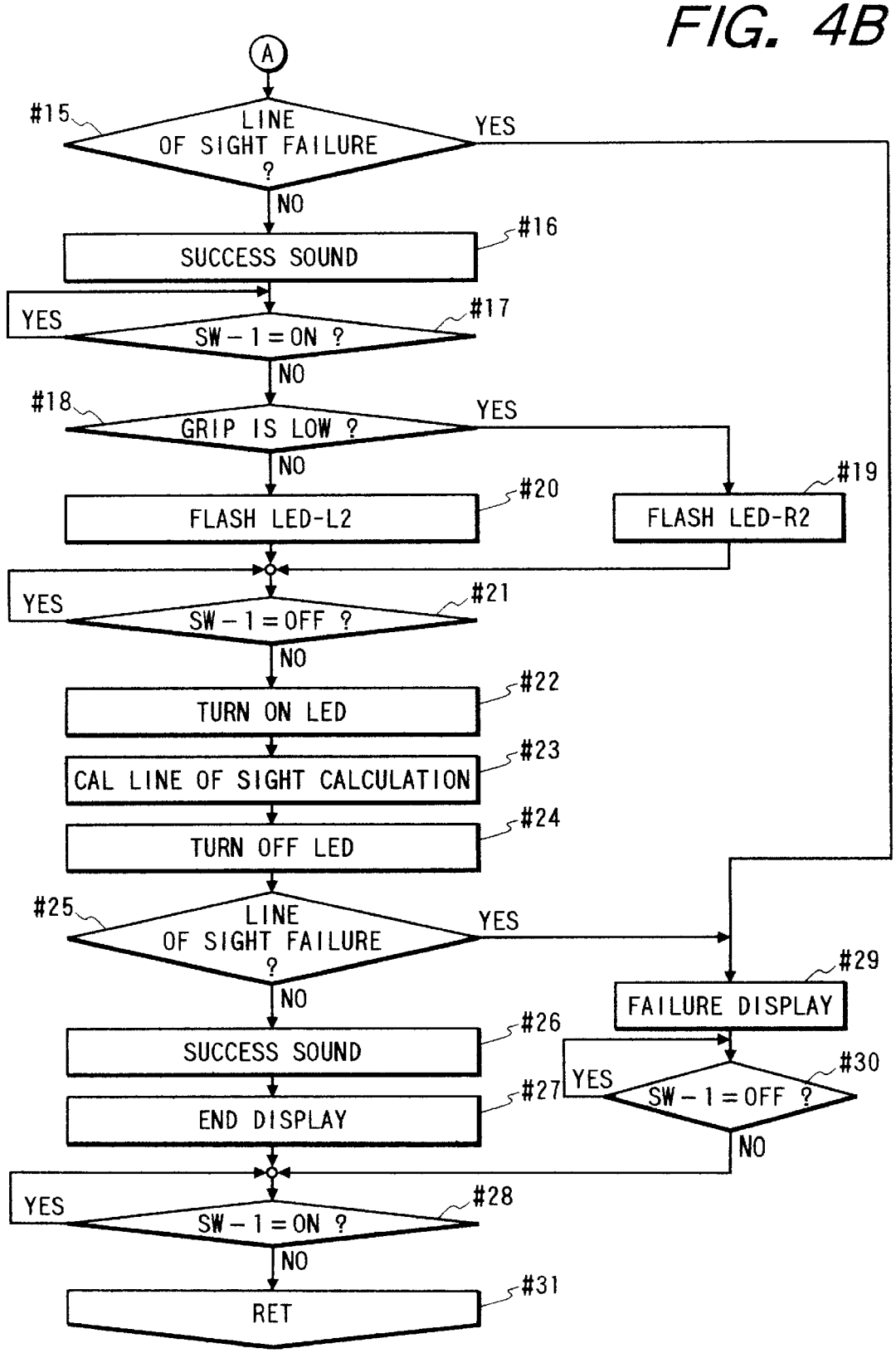
FIG. 4 is comprised of FIGS. 4A and 4B illustrating flowcharts showing a calibrating operation of a camera according to a first embodiment of the present invention.

Referring next to FIGS. 4A and 4B, a description will be made of a calibrating operation and how to display calibration data.

When the mode dial SW-MDIAL of the camera is set to a calibration mode, program control shifts to step #1 to start calibration. In the calibration mode, the calibration number can be changed by turning the electronic dial (SW-DIAL 1). When the electronic dial was changed in the calibration mode, the currently executed routine is interrupted and a calibration number changing processing is started.

Next, parameters are initialized (step #2). After the initial setting was finished, the attitude of the camera is detected and classified into four types; lateral posture, vertical posture with the grip position being up, vertical posture with the grip position being down, and inverse posture (step #3). It is then determined whether there is calibration data for the detected attitude (step #4). If the data exists, the calibration number (CAL No.) is turned on (step #5). If no data exists, the CAL No. is flashed (step #6).

After that, the procedure goes to step #7 and waits until the switch SW-1 turns to be in an OFF-state. While the switch SW-1 remains in an ON-state, the processing steps #3 to #7 are repeated.

When the switch SW-1 turns to the OFF-state, a calibration index is superimposed on the display of the view finder. If the camera is held in a lateral posture, a right-side distance measuring point is used as a first index. If the camera is held in a vertical posture, an upper-side distance measuring point is always used as the first index.

It is therefore required to determine whether the camera is in the vertical posture with the grip position being down (step #8). If so, the LED-L2 is flashed to display the left-side distance measuring mark FP-L2 (step #10). If the camera is in another posture, the LED-R2 is flashed to display the right-side distance measuring mark FP-R2. From this condition, the procedure goes to step #11 and waits until the switch SW-1 turns to the ON-state. While the switch SW-1 remains in the OFF-state, the processing steps #3 to #11 are repeated.

At this time, if the electronic dial is turned, the indication of the calibration number is changed.

When the switch SW-1 is turned ON (step #11), the LED flashed at step #9 or step #10 is turned on (step #12), and a subroutine "CAL. line of sight calculation" is called for the purpose of obtaining calibration data (step #13). The subroutine will be described later in detail in a flowchart of FIGS. 5A and 5B. After an end operation of the subroutine "CAL. line of sight calculation", the LED is turned off (step #14), and a determination is made as to whether the line of sight calculation is failed (step #15). When the calibration was failed, since a flag "CAL_ERR" is set to "1", the failure of the calibrating operation can be determined. If the calibration is successful, the photographer or user is informed that the calibration is successful with a buzzer sound such as a peep sound (step #16).

Next, the procedure goes to step #17 and waits until the switch SW-1 turns to the OFF-state. If the switch SW-1 turns to the OFF-state, a second index is flashed. In a vertical posture with the grip position being down, since the LED to be flashed is different from other postures, the LED to be flashed is first determined (step #18). If the camera is in the vertical posture with the grip position being down, then the LED-R2 is flashed to display the right focal-point detecting mark FP-R2 (step #19). In the other cases, the LED-L2 is flashed to display the left focal-point detecting mark FP-L2 (step #20). Thus, the lower-side distance measuring point is displayed with a flash light when the camera is in the vertical posture, whereas the left-side distance measuring point is displayed with flash light when the camera is in the lateral posture.

The procedure then goes to step #21 and waits again until the switch SW-1 turns to the ON-state. When the switch SW-1 is turned ON, the flashed LED is turned on (step #22), and a subroutine "CAL. line of sight detection" is started (step #23). After an end operation of the line of sight calculation, the LED is turned off (step #24), and a determination is made based on the flag "CAL_ERR" as to whether the line of sight detection is failed (step #25). If not failed, the photographer or user is informed with a buzzer sound such as a peep sound that the line of sight calculation is successful (step #26). Then, the end of the calibration is displayed (step #27) and the procedure waits until the switch SW-1 turns to the OFF-state (step #28). When the switch SW-1 is turned OFF, the procedure is returned (step #31).

Finally, a description will be made of a case that the subroutine "CAL. line of sight calculation" failed in the line of sight calculation.

In this case, the procedure branches from step #15 or #25 to step #29. In other words, a failure of the line of sight calculation is displayed at step #29 by flashing both the "CAL" display and number, and by sounding the buzzer continuously, so that the photographer can recognize that the line of sight calculation is unsuccessful. Then, the procedure goes to step #30 and waits until the switch SW-1 turns to the OFF-state. When the switch SW-1 is turned OFF, the procedure is returned (step #31).

If the mode dial of the camera remains in the calibration mode continuously after being returned, the execution of the program is initiated from step #1.

In brief, a description will be made to of an operation for deleting personal difference correction data.

When the camera is in the calibration mode, the calibration data deletion switch SW-CALDEL is changed to the ON-state so that the personal difference correction data can be deleted in each attitude. By turning the switch SW-CALDEL to the ON-state, the CPU 100 generates an interrupt signal in response to an input from the signal input circuit 104, and initiates an interrupt subroutine "data deletion". After an end operation of the interrupt subroutine "data deletion", the CPU 100 starts a program execution from step #1.

Referring next to the flowchart in FIGS. 5A and 5B, a description will be made of the subroutine "CAL. line of sight calculation" (shown at steps #13 and #23 in the flowchart of FIGS. 4A and 4B) which is the main part of the present invention.

When the subroutine "CAL. line of sight calculation" is called (step #C01), it is first determined whether the camera is in an inverse posture or not. If in the inverse posture, the procedure branches to NAC_CAL_Fail and the calibrating operation is observed. Then, a flag "CAL_ERR" indicative of a failure of the calibration is set to "1" (step #C21).

On the other hand, if not in the inverse posture, the procedure branches to step #C03, parameters needed for calibration are set, and a distance threshold value of an eyeball is set (step #C04). Since the distance threshold value of the eyeball varies in attitude of the camera (between vertical and lateral postures), the calibrating operation waits for a predetermined period of time (100 to 200 msec.) until the line of sight is made stable (step #C05). If the calibrating operation is started immediately without time lag, since the line of sight has not stabilized yet, i.e., the photographer tends to shift glances, accurate calibration data cannot be obtained.

It is then determined whether a glasses determination is finished (step #C06). The glasses determination is performed only at the beginning of the calibrating operation.

When the glasses determination has not been completed, the procedure branches to step #C07. At this step, the attitude of the camera is memorized prior to the glasses determination. In other words, the attitude of the camera a before starting operation for obtaining calibration data can be recorded at this step. The attitude of the camera is obtained from outputs HVSW1, HVSW2 of the photosensors HV1, HV2, and stored as 2-bit information in a predetermined RAM of the CPU 100. The attitude information may be memorized by converting them into flags created for respective attitudes, such as a lateral posture flag, a vertical posture flag 1, a vertical posture flag 2, and an inverse posture flag. Although the information at the attitude detection switches may be used as they are as the attitude information in comparing attitudes, it would be better to memorize the attitude information converted into flags corresponding to respective postures if the attitude information is used for controlling other processings.

Then, the glasses determination is initiated (step #C08). That is, it is determined whether the photographer puts on glasses or looks in at the view finder with the naked-eye at the beginning of the calibration, so that a lighting and accumulation control method to be used herein can be decided. After an end operation of the glasses determination, the result is stored in the RAM, and the "memory of attitude (storing attitude)" and the "glasses determination" are omitted from the next time. It is then determined whether the glasses determination is successful (step #C09). If unsuccessful, since an NAC_NG flag is set to "1", the procedure jumps from step #C10 to a calibration fail processing (NAC_CAL_Fail).

If the glasses determination is successful, the procedure branches to step #C11 and the attitude of the camera is detected. When the attitude of the camera is different from the stored attitude (step #C12), the NAC_NG flag is set to "1" (step #C13), and the procedure jumps to the calibration fail processing (NAC_CAL_Fail) (step #C14).

When the attitude of the camera obtained at step #C11 corresponds to the stored attitude, the procedure goes to a subroutine "Cal Sample", and line of sight detection is performed for obtaining calibration data (step #C15). In the subroutine "Cal Sample", the line of sight detection is repeated a predetermined number of times, and the repeatedly detected line of sight data are processed statistically for the purpose of increasing the accuracy of the line of sight data. At this time, the sensor control method and lighting decided by the subroutine "glasses determination" is used in this subroutine "Cal Sample". If adequate data cannot be obtained even after the line of sight calculation was repeated a predetermined number of times, the subroutine is regarded as failing the calibration (CAL_ERR=1).

After an end operation of obtaining calibration data, it is determined whether the calibration is of a second point (step #C16). If the calibration is of the second point and it is successful (CAL_ERR=0), the procedure branches to step #C18. When there exists calibration data prior to the calibration data obtained this time, the prior calibration data is read from the EEPROM into the RAM. A new calibration data is then calculated from the data obtained this time and the prior data (step #C19). Finally, the new calibration data is saved in the EEPROM (step #C20), and the procedure is returned.

In the end, the calibration fail processing (NAC_CAL_Fail) will be described.

In such cases as the camera is in the inverse posture at the beginning of calibration, the glasses determination is considered to have failed, and the attitude of the camera is changed during the calibrating operation, the procedure branches to the calibration fail processing (NAC_CAL_Fail). At this time, a failure of the calibration (CAL_ERR=1) is set (step #C21), and the procedure is returned (step #C22).

Since the subroutine "CAL. line of sight calculation" can be called twice during the calibrating operation in FIGS. 4A and 4B (steps #13 and #23 in FIGS. 4A and 4B), a supplementary description will be made herein to different points between first and second call operations.

Figure 5B:
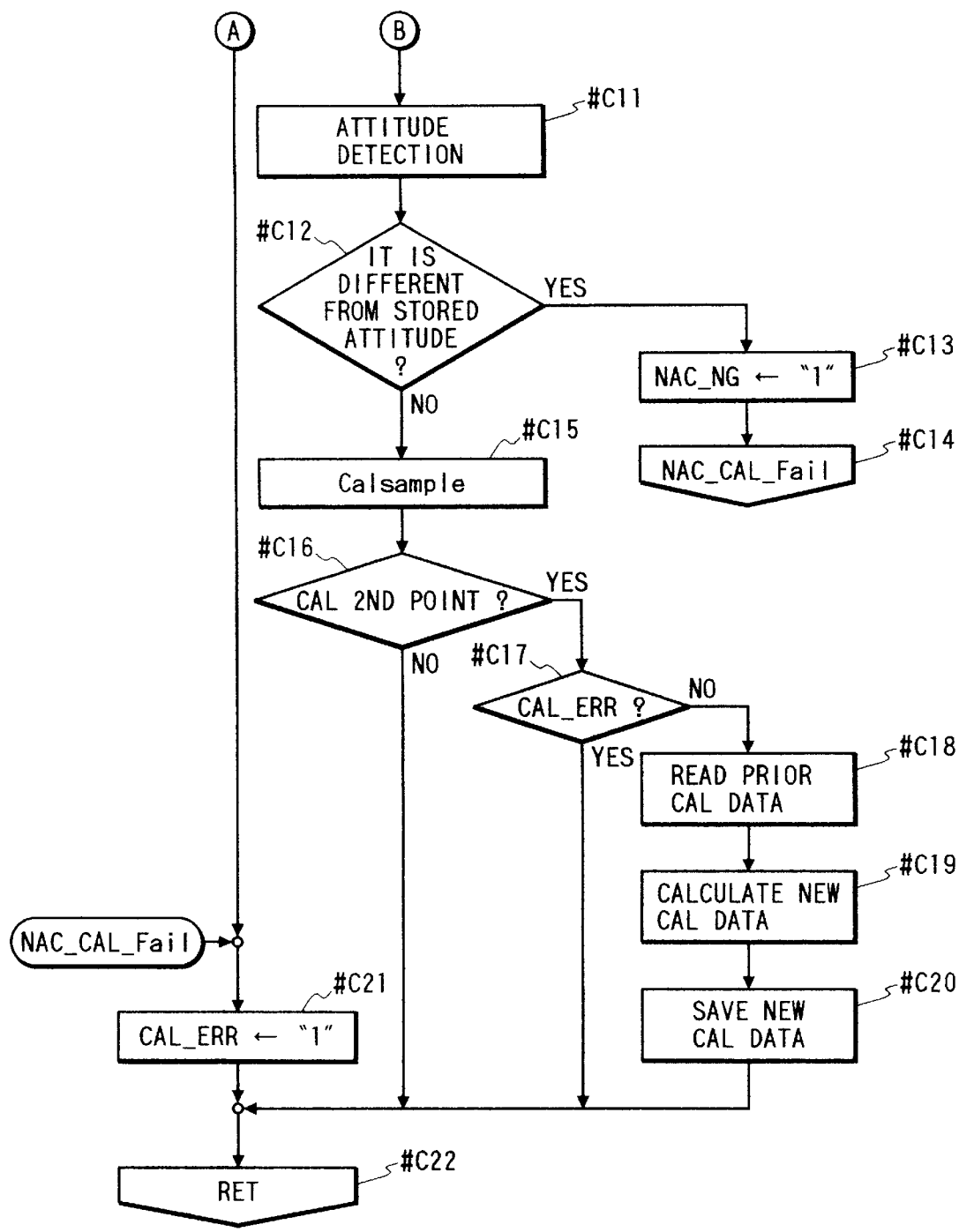
FIG. 5 is comprised of FIGS. 5A and 5B illustrating flowcharts showing an operation of a subroutine "CAL. line of sight calculation" executed at step #13 in FIG. 4.

When the subroutine "CAL. line of sight calculation" is called from step #13, since the glasses determination has not been finished at step #C06 in FIGS. 5A and 5B, the attitude of the camera is memorized at step #C07. At step #16, the calibration is not of the second point, so that the calculation or save of the calibration data is not performed.

On the other hand, when the subroutine "CAL. line of sight calculation" is called from step #23 (calibration second point), the procedure does not branch from step #C06 to step #C07 and goes to step #C11. Consequently, the attitude at the calibration second point is compared at the next step #C12 with the attitude stored by the CAL line of sight calculation called at step #13 in FIG. 4, i.e., with the attitude firstly stored at the beginning of the calibration. After obtaining the data, the step #C16 branches to steps #C17 and #C18, and a new calibration data is calculated and saved.

As such above, the attitude of the camera is memorized at the beginning of the calibration, and the attitude at the calibration first point is compared with the attitude at the calibration second point to determine whether there is a change in attitude between the calibration first point and the calibration second point. If a change occurs, the CAL line of sight calculation is regarded as failing the calibration, thus preventing error calibration data from being input.

(Second Embodiment)

In the first embodiment discussed above, although the attitude at the calibration first point is compared with the attitude at the calibration second point, the attitude comparison may be performed for every line of sight calculation in the subroutine "Cal Sample" (step #C15 in FIGS. 5A and 5B).

Figure 6:
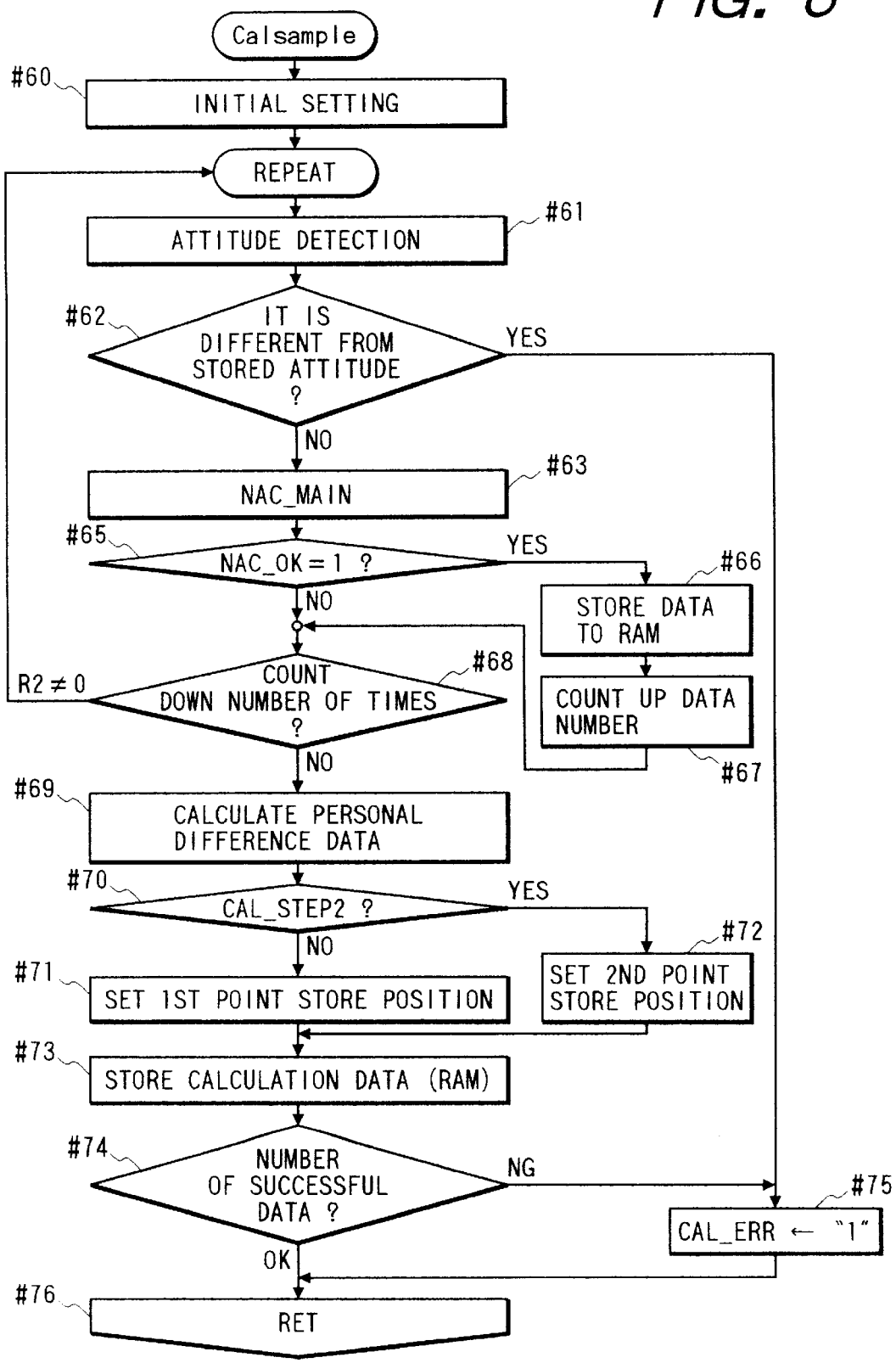
FIG. 6 is a flowchart showing an operation of a subroutine "Cal Sample" in a camera according to a second embodiment of the present invention.

FIG. 6 is a flowchart explaining a second embodiment of the present invention.

Referring to FIG. 6, a description will be made in detail of the subroutine "Cal Sample" shown at step #C15 in FIGS. 5A and 5B.

When the subroutine is called, parameters are initialized prior to the CAL line of sight calculation (step #60), such as to set the number of times the line of sight detection is tried in the calibrating operation, to set an address for storing the obtained data, to clear a counter for counting the number of times the line of sight detection is successful, and to clear the flag "CAL_ERR". Then, the attitude of the camera is detected (step #61) and compared with the attitude previously memorized at step #C07 in FIGS. 5A and 5B (step #62). If the compared attitudes are different from each other, the procedure branches to step #75, and the flag "CAL_ERR" is set to "1" to indicate that the calibration is failed (step #75). After that, the subroutine is immediately returned (step #76).

If no change occurs between the compared attitudes, the calibration data is input (step #63) to determine the results of the line of sight detection. When the line of sight detection is successful, since the flag "NAC_OK" is set to "1", the results can be determined (step #65). If the line of sight detection is successful, line of sight data detected this time is stored in a predetermined address at step #66, and the number of successful data is counted at step #67.

Next, the counter for counting the number of times the line of sight detection is tried is counted down (step #68), and if it is not "0", the processing steps #61 to #68 are repeated a predetermined number of times. After repeating these steps a predetermined number of times, the procedure exits the loop, and the personal difference data calculation is initiated (step #69). At this step, data of one index can be calculated. It is then determined by a flag "CAL_STEP2" whether the calibration is of the first point or second point. In the case of the first point, the procedure goes to step #71. If it is of the second point, the procedure branches to step #72. At steps #71 and #72, respective addresses are set for storing the calculated data. After setting the addresses, the calculated data are stored in the respective addresses (step #73). It is then determined whether the number of successful data (counted at step #67) is in excess of a predetermined number, and if less than the predetermined number, the flag "CAL_ERR" is set to "1". Finally, the subroutine is returned (step #76).

As such above, the attitude of the camera is memorized at the beginning of the calibration, and a determination is made for every line of sight detection as to whether there is a change in attitude during the calibrating operation by comparing the detected attitude with the prior attitude. If a change occurs, the line of sight detection is regarded as failing the calibration, thus preventing error calibration data from being input.

Figure 9B:
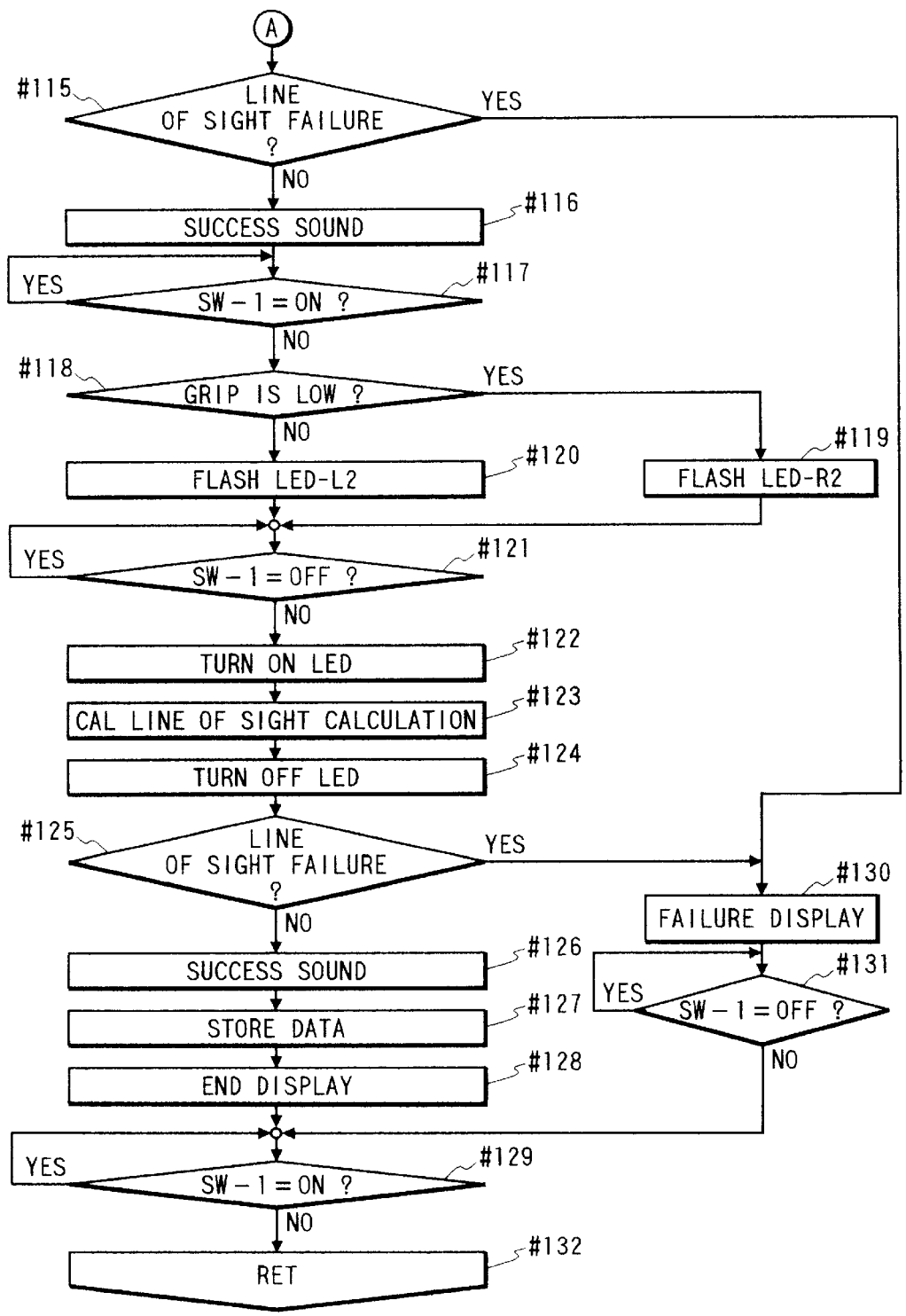
FIG. 9 is comprised of FIGS. 9A and 9B illustrating flowcharts showing a calibrating operation of the camera in FIG. 1, which explains the third embodiment of the present invention.

Referring next to FIGS. 9A and 9B, a description will be made of the calibrating operation and how to display calibration data.

When the mode dial SW-MDIAL of the camera is set to a calibration mode, program control shifts to step #101 to start calibration. In the calibration mode, the calibration number can be changed by turning the electronic dial SW-DIAL 1. When the electronic dial was changed in the calibration mode, the currently executed routine is interrupted and a calibration number changing processing is started. After an end operation of changing the calibration number in the interrupt processing, the procedure shifts to step #102 without returning to the step at which the interrupt occurred.

Next, parameters are initialized (step #102). When the initial setting is finished, the attitude of the camera is detected and classified into four types; lateral posture, vertical posture with the grip position being up, vertical posture with the grip position being down, and inverse posture (step #103). It is then determined whether there is calibration data corresponding to the detected attitude (step #104). If the data exists, the calibration number (CAL No.) is turned on (step #105). If no data, the calibration number is flashed (step #106).

After that, the procedure goes to step #107 and waits until the switch SW-1 turns to the OFF-state. While the switch SW-1 remains in the ON-state, the processing steps #103 to #107 are repeated.

When the switch SW-1 turns to the OFF-state, a calibration index is superimposed on the display of the view finder. If the camera is held in the lateral posture, a right-side distance measuring point is used as a first index. If the camera is held in a vertical posture, an upper-side distance measuring point is always used as the first index.

It is therefore required to determine whether the camera is in the vertical posture with the grip position being down (step #108). If so, the LED-L2 is flashed to display the left-side distance measuring mark FP-L2 (step #110). If the camera is in another posture, the LED-R2 is flashed to display the right-side distance measuring mark FP-R2. From this condition, the procedure goes to step #111 and waits until the switch SW-1 turns to the ON-state. While the switch SW-1 remains in the OFF-state, the processing steps #103 to #111 are repeated.

Figures 10A, 10B, 10C:
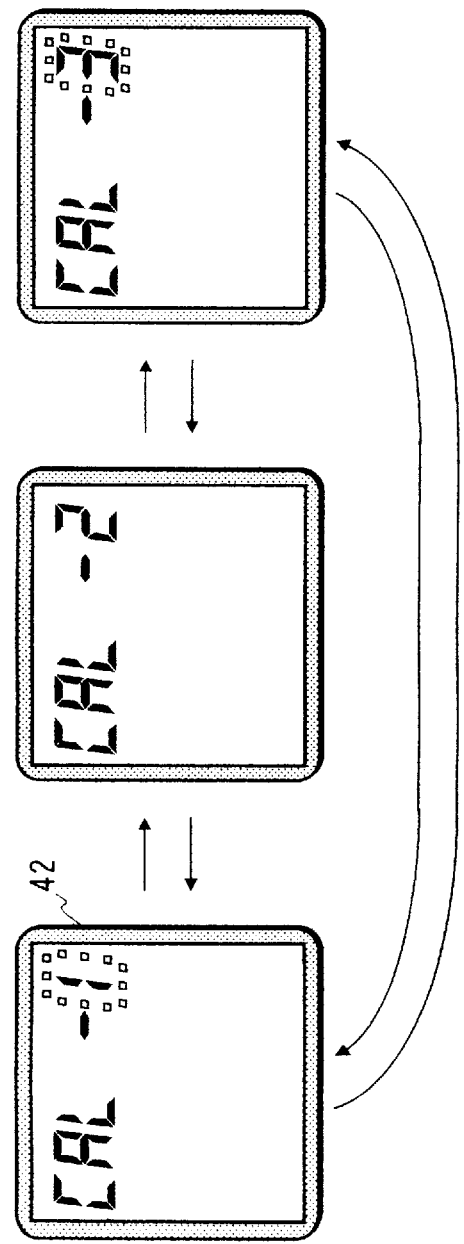
FIGS. 10A to 10C are diagrams explaining the third embodiment of the present invention, each showing an example of a display when a calibration number is changed in the camera in FIG. 1.

At this time, if the electronic dial is turned, the indication of the calibration number is changed as shown in FIGS. 10A to 10C. In this case, there is only lateral data for the calibration number 2, but no data for the calibration numbers 1 and 3. Accordingly, an indication of the numbers CAL-1 and CAL-3 are flashed.

FIGS. 11A1 to 11C3 show examples of a display in respective postures when only the lateral data is input at calibration number 2. In FIGS. 11A1 and 11A3, since the camera is in the lateral posture and the calibration data exists, the numbered display portion is turned on, and the superimposed lighting of the LED-R2 is turned on to display the distance measuring mark FP-R2. In FIGS. 11B1 and 11B3, since the camera is in a vertical posture with the grip position being down, there is no calibration data and the numbered display portion is flashed. In this case, lighting of an upper-side distance measuring point is superimposed, i.e., the LED-L2 is flashed to display the distance measuring mark FP-L2. In FIGS. 11C1 and 11C3, since the camera is in a vertical posture with the grip position being up, there is no calibration data and the numbered display portion is flashed, so that the LED-R2 is flashed to display the distance measuring mark FP-R2.

FIGS. 12A1 to 12C2 show a shift of the display during an operation for inputting calibration data at the calibration number 2 when the camera is held in a vertical posture with the grip position being up. At step #111 in FIG. 9A, the numbered portion and the superimposed lighting is displayed as shown in FIG. 12A1.

When the switch SW-1 is turned ON, the LED flashed at step #109 or step #110 is turned on (step #112), and a subroutine "CAL. line of sight calculation" is called for the purpose of obtaining calibration data (step #113). After an end operation of the subroutine "CAL. line of sight calculation", the LED is turned off (step #114), and a determination is made as to whether the line of sight calculation is failed (step #115). If not failed, the photographer or user is informed that the calibration is successful with a buzzer sound such as a peep sound (step #116).

Next, the procedure goes to step #117 and waits until the switch SW-1 turns to the OFF-state. If the switch SW-1 turns to the OFF-state, a second index is flashed. In a vertical posture with the grip position being down, since the LED to be flashed is different from other postures, the LED to be flashed is first determined (step #118). If the camera is in the vertical posture with the grip position being down, then the LED-R2 is flashed to display the distance measuring mark FP-R2 (step #119). In the other cases, the LED-L2 is flashed to display the distance measuring mark FP-L2 (step #120). Thus, the lower-side distance measuring point is displayed with a flashing light when the camera is in the vertical posture, whereas the left-side distance measuring point is displayed with a flashing light when the camera is in the lateral posture. The display and the attitude of the camera at this time (during operation for inputting calibration data at the calibration number 2 when the camera is held in a vertical posture with the grip position being up) are shown in FIGS. 12B1 and 12B2.

The procedure then goes to step #121 and waits again until the switch SW-1 turns to the ON-state. When the switch SW-1 is turned ON, the flashed LED is turned on (step #122), and a subroutine "CAL. line of sight detection" is started (step #123). After an end operation of the line of sight calculation, the LED is turned off (step #124), and a determination is made as to whether the line of sight detection is failed (step #125). If successful, the photographer or user is informed with a buzzer sound such as a peep sound that the line of sight calculation is successful (step #126). Then, the obtained data are stored in the EEPROM 100a of the CPU 100 so that the obtained data corresponds to the attitude of the camera and the calibration number (step #127), and the end of the calibration is displayed as shown in FIGS. 12C1 and 12C2 (step #128). Consequently, the procedure goes to step #129 and waits until the switch SW-1 turns to the OFF-state (step #129). When the switch SW-1 is turned OFF, the procedure is returned (step #132).

Finally, a description will be made of a case that the subroutine "CAL. line of sight calculation" failed in the line of sight calculation at step #113 or #123.

At steps #113 and #123, although the data are obtained by repeating the line of sight detecting operation plural times, if a predetermined number of data is not obtained or when the obtained data are distributed in a wide range, the line of sight calculation is regarded as failing the calibration.

In this case, the procedure branches from step #115 or #125 to step #130. In other words, a failure of the line of sight calculation is displayed at step #130 by flashing both the "CAL" display and number, and by sounding the buzzer continuously, so that the photographer can recognize that the line of sight calculation is unsuccessful. Then, the procedure waits until the switch SW-1 is turned ON and OFF (steps #131 and #129) and the subroutine is returned (step #132).

If the mode dial of the camera remains in the calibration mode continuously after being returned, the execution of the program is initiated from step #1.

As described above, according to such a structure, a determination can be made not only of an attitude of the camera to which the personal difference data in each posture is input, but also as to whether there is personal difference correction data in the posture in which the camera is held, and this is easy to understand. Also, by using such a method, a state in a vertical posture can be displayed without increasing display segments.

In brief, a description will be made of a operation for deleting personal difference correction data.

When the camera is in the calibration mode, the calibration data deletion switch SW-CALDEL is changed to the ON-state so that the personal difference correction data can be deleted in each attitude. By turning ON the switch SW-CALDEL, the CPU 100 generates an interrupt signal in response to an input from the signal input circuit 104, and initiates an interrupt subroutine "data deletion". The interrupt subroutine will be described with reference to FIG. 13.

The control of the program shifts to step #140 in response to the interrupt signal, and an attitude of the camera is first detected (step #141). It is then determined whether the camera is in the vertical posture with the grip position being down (step #142), and if so, the personal difference correction data in that posture is deleted (step #143). After an end operation of deleting the data, an index is displayed for inputting calibration data after the interrupt processing. In the vertical posture with the grip position being down, the first index is the FP-L2, so that the LED-L2 is flashed (step #144). To show no calibration data after the data deletion, the calibration number is then flashed (step #149). Finally, the interrupt subroutine is returned (step #150).

Next, a description will be made of the other attitudes of the camera (the attitudes when the camera is held in postures other than the vertical posture with the grip position being down).

The procedure branches from step #142 to step #145 and a determination is made as to whether the camera is in the vertical posture with the grip position being up (step #145), and if so, the personal difference correction data in that posture is deleted (step #146). If not in the vertical posture, the personal difference correction data in the lateral posture is deleted (step #147). After deleting all the data, a first index is flashed. In this case, the first index is the FP-R2, so that the LED-R2 is flashed (step #148). To indicate that all the data is deleted, the calibration number is then flashed (step #149). Finally, the interrupt subroutine is returned (step #150). After deleting all the calibration data in the interrupt processing, the procedure shifts to step #102 in FIG. 9A without returning to the step at which the interrupt occurred.

As such above, the deletion switch is operated in the posture to be deleted, and this is easy to understand. For example, when a photographer or user desires to delete the calibration data in the vertical posture with the grip position being up, the photographer has only to hold the camera in the vertical posture with the grip side turned up and to operate the deletion switch.

(Fourth embodiment)

Although the third embodiment discussed above showed examples of the display when the camera is held in a posture in which no personal difference correction data is memorized, the present invention is not limited thereto, and the presence of the personal difference correction data in all postures may be displayed irrespective of the attitude of the camera.

Figure 14A:
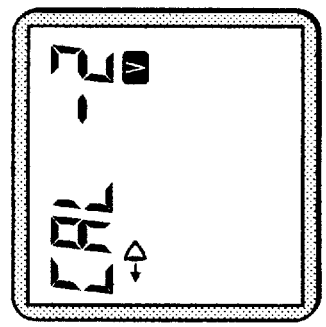
FIGS. 14A to 14C are diagrams showing examples of a display for indicating whether there is personal difference correction data in a camera according to a fourth embodiment of the present invention.
Figure 14B:
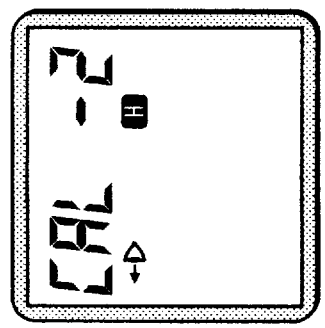
Figure 14C:
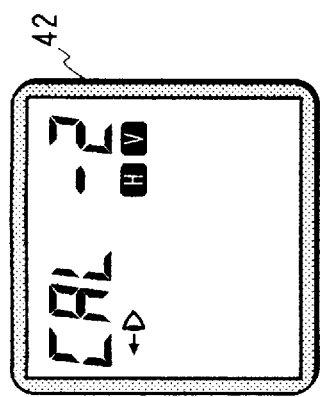

FIGS. 14A to 14C are diagrams showing display examples in such cases. FIG. 14A shows a case that the personal difference correction data is found in all postures (H, V). FIG. 14B shows a case that the personal difference correction data is found only in the lateral posture (H), whereas FIG. 14C shows a case that the personal difference correction data is found only in the vertical posture (V).

In this example, although the vertical posture is not divided into the cases that the grip is turned up and the grip is turned down, it may be divided by increasing the display segments. If such a dedicated segment is provided, the data can be always displayed not only in the calibration mode, but also in a normal photo-mode when the line of sight detection needs to be performed.

Figure 15C:
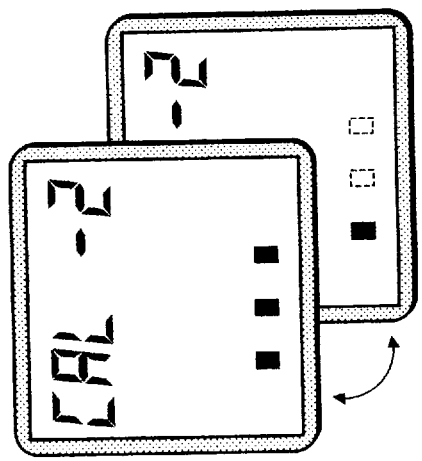
FIGS. 15A to 15C are diagrams showing other examples of a display for indicating whether there is personal difference correction data in the camera according to the fourth embodiment of the present invention.
Figure 15B:
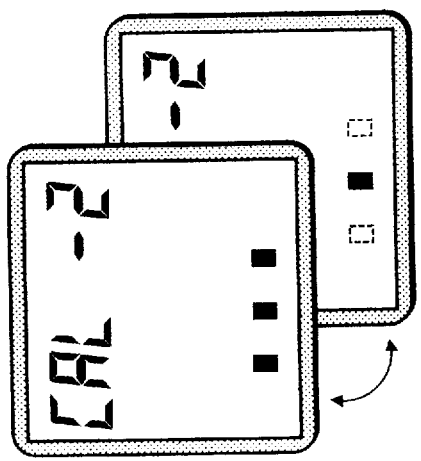
Figure 15A:
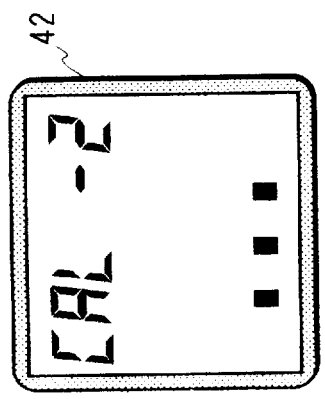

FIGS. 15A to 15C are diagrams showing other display examples. In this example, the attitude of the camera in which the personal difference correction data is found is displayed by using an exposure correction segment without adding a special segment for attitude display.

FIG. 15A shows a case that the personal difference correction data is found in all postures. FIG. 15B shows a case that only the lateral data is found. In this case, lighting of three segments and lighting of the middle segment indicative of the lateral posture are repeatedly displayed. In other words, both ends of segments indicative of the vertical postures are flashed to indicate no data in the vertical postures. FIG. 15C shows a case that the data is found only in the vertical posture with the grip position being down.

(Fifth Embodiment)

Figure 13:
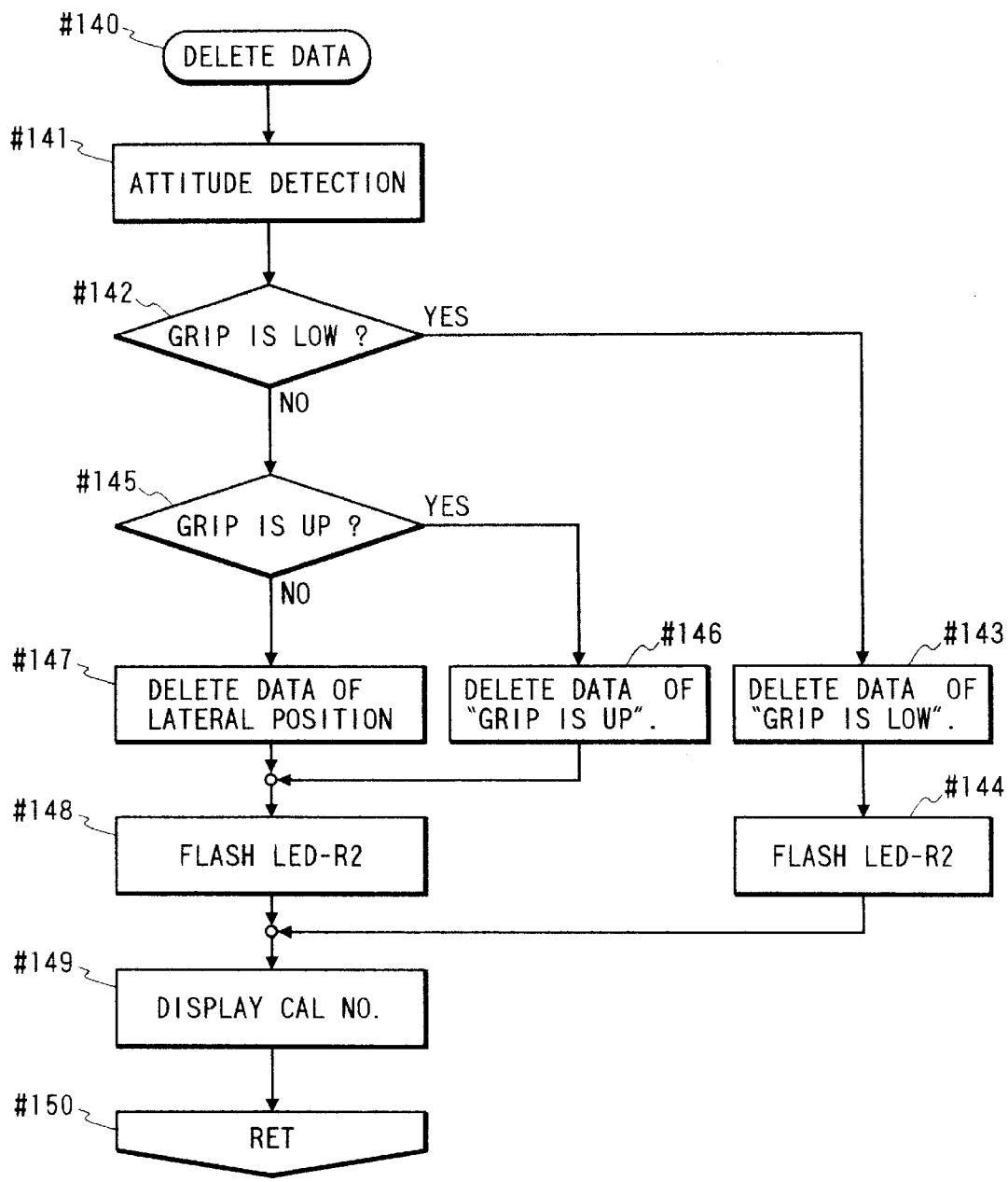
FIG. 13 is a flowchart explaining the third embodiment of the present invention, which shows an operation for deleting calibration data in the camera in FIG. 1.
Figure 16:
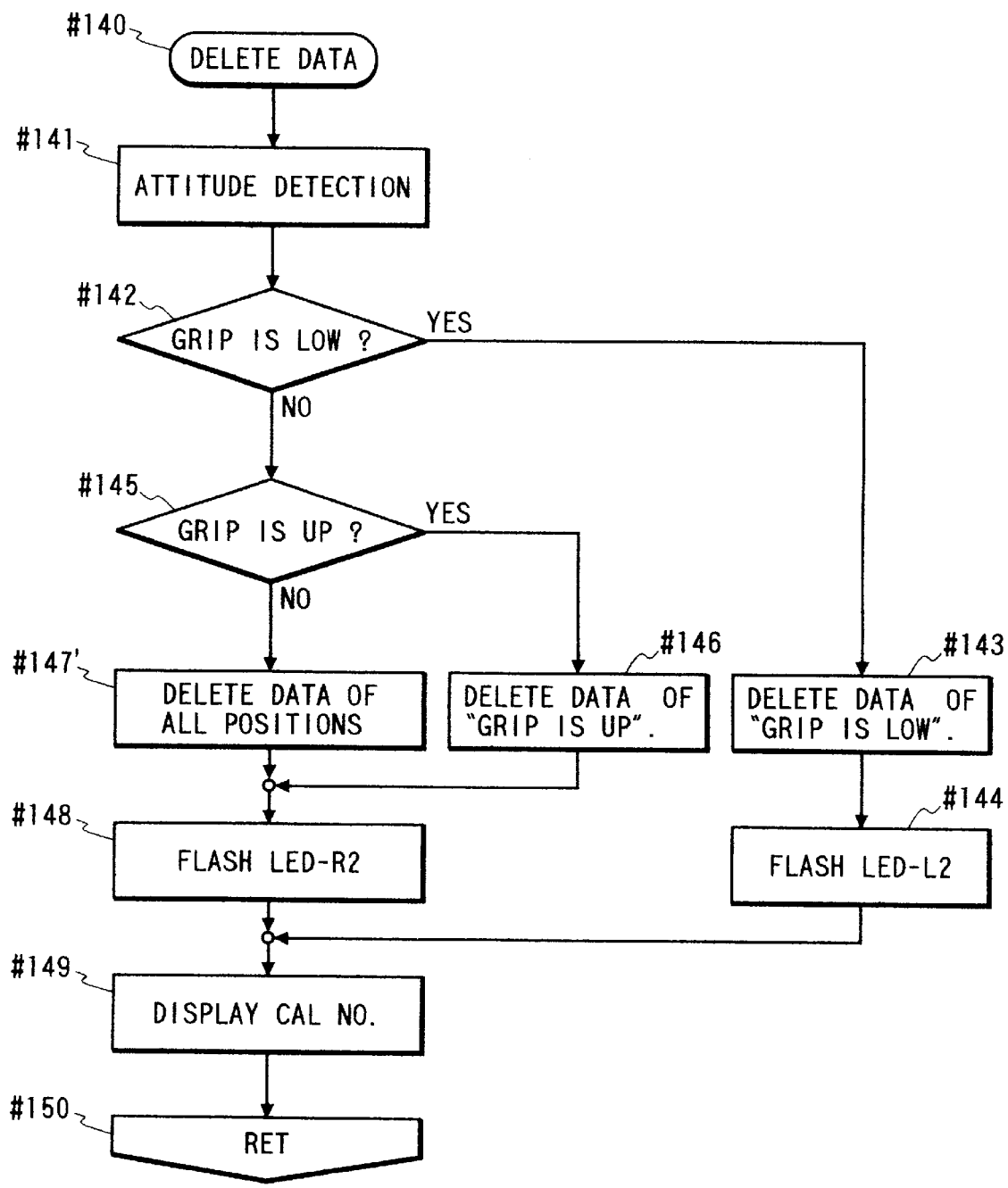
FIG. 16 is a flowchart showing an operation for deleting calibration data in a camera according to a fifth embodiment of the present invention.
Figure 17:
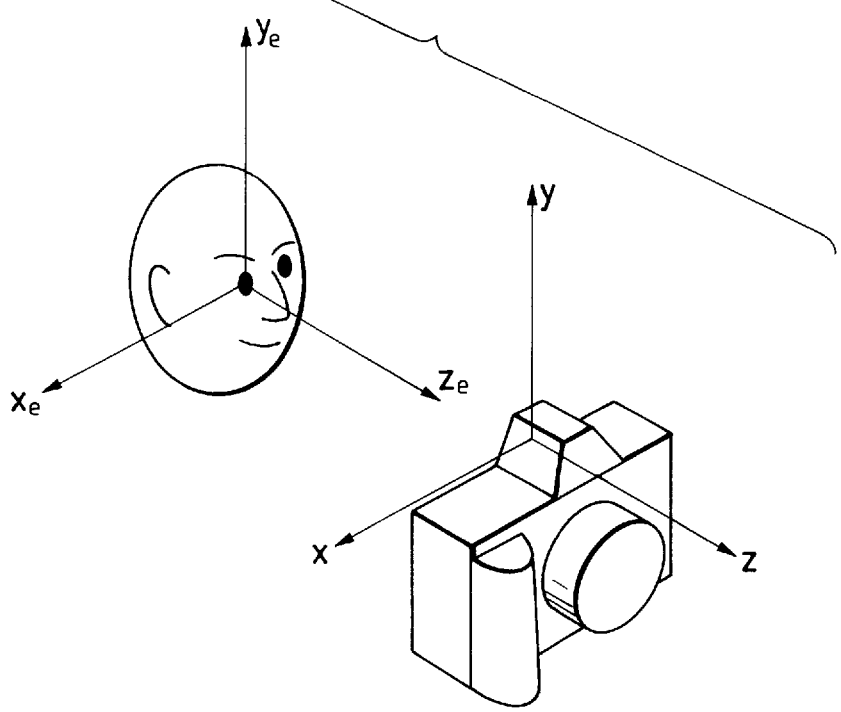
FIG. 17 is a perspective view showing man and camera coordinate systems when the camera is held in the lateral posture.
Figure 19:
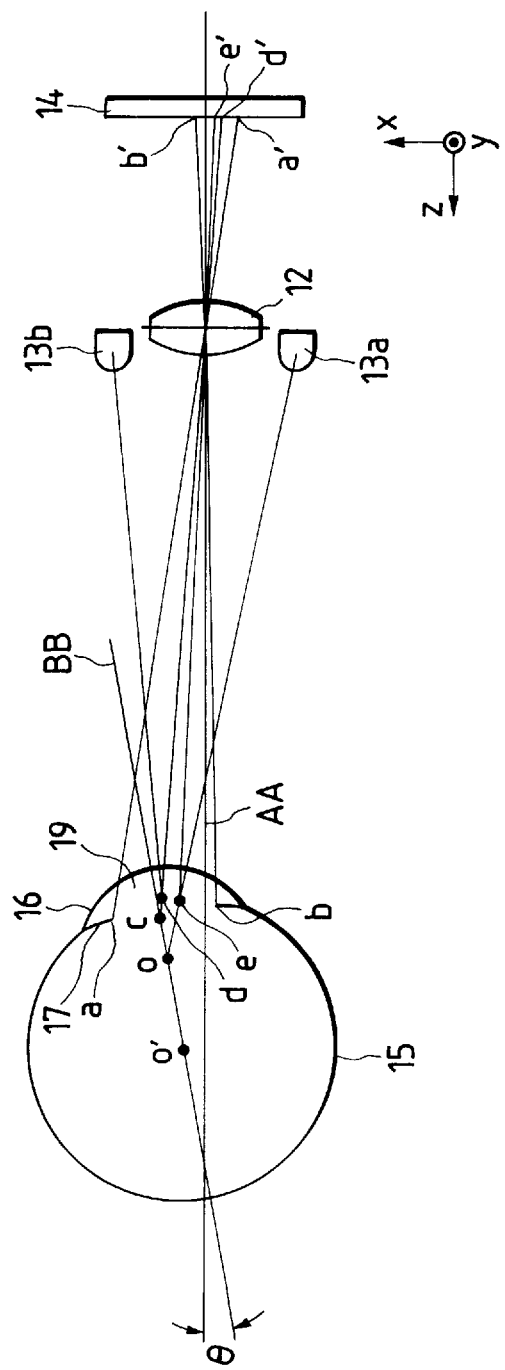
FIG. 19 is a diagram explaining how a line of sight of a user is detected.

FIG. 16 is a flowchart showing operation of the main part of a line of sight detection device according to a fifth embodiment of the present invention (i.e., showing a data deleting operation corresponding to FIG. 13). Although the electric circuit structure of the device is the same as in FIG. 1, the description is omitted.

In this embodiment, all the data can be deleted in a specific posture, differently from such a case as the data is deleted individually in each posture of the camera. In other words, the vertical data can be deleted individually, and all the data can be deleted when deleting the lateral data.

If the camera is in the calibration mode, the personal difference correction data can be deleted in each posture by turning ON the deletion switch SW-CALDEL. When the switch SW-CALDEL is turned ON, the CPU 100 generates an interrupt signal in response to an input from the signal input circuit 104, and initiates an interrupt subroutine "data deletion". The interrupt subroutine will be described with reference to the flowchart in FIG. 16.

The control of the program shifts to step #140 in response to the interrupt signal, and an attitude of the camera is first detected (step #141). It is then determined whether the camera is in the vertical posture with the grip position being down (step #142), and if so, the personal difference correction data in that posture is deleted (step #143). After an end operation of deleting the data, an index is displayed for inputting calibration data after the interrupt processing. In the vertical posture with the grip position being down, the first index is the FP-L2, so that the LED-L2 is flashed (step #144). To show no calibration data after the data deletion, the calibration number is then flashed (step #149). Finally, the interrupt subroutine is returned (step #150). After deleting all the calibration data in the interrupt processing, the procedure shifts to step #102 in FIG. 9A without returning to the step at which the interrupt occurred.

Next, a description will be made of the other attitudes of the camera.

The procedure branches from step #142 to step #145, and a determination is made as to whether the camera is in the vertical posture with the grip position being up (step #145), and if so, the personal difference correction data in that posture is deleted (step #146). If not in the vertical posture, the personal difference correction data in all postures are deleted (step #147'). After deleting all the data, a first index is flashed. In this case, the first index is the FP-R2, so that the LED-R2 is flashed (step #148). To indicate that the all the data is deleted, the calibration number is then flashed (step #149). Finally, the interrupt subroutine is returned (step #150).

The reason why such a structure was provided is because there is a need to delete all the prior data and hence to input new data again when others use the same camera. Since all the data can be deleted by deleting the lateral data, the vertical data can be securely deleted without fail. Further, only the vertical data can be input again after inputting the lateral data.

Furthermore, the data to be deleted may be selected alternatively when deleting data in the lateral posture, such as deleting only the data in the lateral posture or deleting all the data. The attitude of the camera for deleting all the data is not limited to the lateral posture, and other attitudes are possible.

In the above preferred embodiments, although the data cannot be deleted unless the camera is kept in a required posture, the data to be deleted may be selected without holding the camera in the corresponding posture.

What is claimed is:

1. A line of sight detection device for detecting a line of sight of a user by using personal data of the user, said device comprising:

a) personal data obtaining means for obtaining the personal data related to the line of sight of said user;

b) attitude detection means for detecting an attitude of said device;

c) memory means for storing the attitude of said device detected by said attitude detection means, said memory means storing the attitude of said device at a time when said personal data obtaining means starts an obtaining operation of said personal data; and d) determination means for comparing the attitude of said device stored in said memory means with the attitude of said device during the obtaining operation for said personal data by said personal data obtaining means, and for outputting information indicative of a failure of the obtaining operation of said personal data when the compared attitudes of said device are different from each other.

2. The device according to claim 1, wherein said personal data obtaining means includes light-receiving means for receiving an image of an eyeball of said user, so that the personal data related to the line of sight of said user is obtained by detecting an optical axis of the eyeball of said user based on the received image of the eyeball.

3. The device according to claim 2, wherein said personal data obtaining means obtains the personal data based on a gap between the optical axis of the eyeball of said user and the line of sight of said user.

4. A line of sight detection device for detecting a line of sight of a user by using personal data of the user, said device comprising:

a) display means for indicating a plurality of indexes at different positions of a field of the user in order to obtain personal data related to the line of sight of said user;

b) personal data obtaining means for obtaining the personal data related to the line of sight of said user based on a state of an eyeball of said user at a time when said user looks at said indexes;

c) attitude detection means for detecting an attitude of said device;

d) memory means for storing the attitude of said device detected by said attitude detection means, said memory means storing a first attitude at a time when said user looks at a first index of said plurality of the indexes and a second attitude at a time when said user looks at a second index of said plurality of indexes; and e) determination means for outputting information indicative of a failure of the obtaining operation of said personal data when said first and second attitudes stored in said memory means are different from each other.

5. The device according to claim 4, wherein said personal data obtaining means includes light-receiving means for receiving an image of an eyeball of said user, so that the personal data related to the line of sight of said user is obtained by detecting an optical axis of the eyeball of said user based on the received image of the eyeball.

6. The device according to claim 5, wherein said personal data obtaining means obtains the personal data based on a gap between the optical axis of the eyeball of said user and the line of sight of said user.

7. A line of sight detection device for detecting a line of sight of a user by using personal data of the user, said device comprising:

a) attitude detection means for detecting an attitude of said device;

b) personal data obtaining means for obtaining the personal data related to the line of sight of said user in accordance with the attitude of said device;

c) memory means for storing said personal data for every attitude of said device, said personal data obtained by said personal data obtaining means; and d) display means for displaying information indicative of the presence of said personal data stored in said memory means and indicative of the attitude of said device corresponding to said personal data.

8. The device according to claim 7, further comprising deletion means for deleting said personal data for every attitude of said device, said personal data stored in said memory means for every attitude of said device.

9. The device according to claim 8, wherein said deletion means can collectively delete specific personal data from said personal data stored in said memory means independently of the attitude of said device at a time when said device is in a predetermined attitude.

10. A line of sight detection device for detecting a line of sight of a user by using personal data of the user, said device comprising:

a) attitude detection means for detecting an attitude of said device;

b) personal data obtaining means for obtaining the personal data related to the line of sight of said user;

c) memory means for storing said personal data obtained by said personal data obtaining means and the attitude of said device in an obtaining operation of said personal data; and d) display means for displaying information indicative of the presence of said personal data stored in said memory means and indicative of the attitude of said device corresponding to said personal data.

11. The device according to claim 10, further comprising deletion means for deleting said personal data for every attitude of said device, said personal data stored in said memory means for every attitude of said device.

12. The device according to claim 11, wherein said deletion means can collectively delete specific personal data from said personal data stored in said memory means independently of the attitude of said device at a time when said device is in a predetermined attitude.

13. An apparatus having a line of sight detection device for detecting a line of sight of a user by using personal data of the user, said apparatus comprising:

a) personal data obtaining means for obtaining the personal data related to the line of sight of said user;

b) attitude detection means for detecting an attitude of said device;

c) memory means for storing the attitude of said device detected by said attitude detection means, said memory means storing the attitude of said device at a time when said personal data obtaining means starts an obtaining operation of said personal data; and d) determination means for comparing the attitude of said device stored in said memory means with the attitude of said device during the obtaining operation for said personal data by said personal data obtaining means, and for outputting information indicative of a failure of the obtaining operation of said personal data when the compared attitudes of said device are different from each other.

14. The apparatus according to claim 13, wherein said personal data obtaining means includes light-receiving means for receiving an image of an eyeball of said user, so that the personal data related to the line of sight of said user is obtained by detecting an optical axis of the eyeball of said user based on the received image of the eyeball.

15. The apparatus according to claim 14, wherein said personal data obtaining means obtains the personal data based on a gap between the optical axis of the eyeball of said user and the line of sight of said user.

16. An apparatus having a line of sight detection device for detecting a line of sight of a user by using personal data of the user, said apparatus comprising:

a) display means for indicating a plurality of indexes at different positions of a field of the user in order to obtain personal data related to the line of sight of said user;

b) personal data obtaining means for obtaining the personal data related to the line of sight of said user based on a state of an eyeball of said user at a time when said user looks at said indexes;

c) attitude detection means for detecting an attitude of said device;

d) memory means for storing the attitude of said device detected by said attitude detection means, said memory means storing a first attitude at a time when said user looks at a first index of said plurality of the indexes and a second attitude at a time when said user looks at a second index of said plurality of indexes; and e) determination means for outputting information indicative of a failure of the obtaining operation of said personal data when said first and second attitudes stored in said memory means are different from each other.

17. The apparatus according to claim 16, wherein said personal data obtaining means includes light-receiving means for receiving an image of an eyeball of said user, so that the personal data related to the line of sight of said user is obtained by detecting an optical axis of the eyeball of said user based on the received image of the eyeball.

18. The apparatus according to claim 17, wherein said personal data obtaining means obtains the personal data based on a gap between the optical axis of the eyeball of said user and the line of sight of said user.

19. An apparatus having a line of sight detection device for detecting a line of sight of a user by using personal data of the user, said apparatus comprising:

a) attitude detection means for detecting an attitude of the device;

b) personal data obtaining means for obtaining the personal data related to the line of sight of said user in accordance with the attitude of said device;

c) memory means for storing said personal data for every attitude of said device, said personal data obtained by said personal data obtaining means; and d) display means for displaying information indicative of the presence of said personal data stored in said memory means and indicative of the attitude of said device corresponding to said personal data.

20. The apparatus according to claim 19, further comprising deletion means for deleting said personal data for every attitude of said device, said personal data stored in said memory means for every attitude of said device.

21. The apparatus according to claim 20, wherein said deletion means can collectively delete specific personal data from said personal data stored in said memory means independently of the attitude of said device at a time when said device is in a predetermined attitude.

22. An apparatus having a line of sight detection device for detecting a line of sight of a user by using personal data of the user, said apparatus comprising:

a) attitude detection means for detecting an attitude of said device;

b) personal data obtaining means for obtaining the personal data related to the line of sight of said user;

c) memory means for storing said personal data obtained by said personal data obtaining means and the attitude of said device in an obtaining operation of said personal data; and d) display means for displaying information indicative of the presence of said personal data stored in said memory means and indicative of the attitude of said device corresponding to said personal data.

23. The apparatus according to claim 22, further comprising deletion means for deleting said personal data for every attitude of said device, said personal data stored in said memory means for every attitude of said device.

24. The apparatus according to claim 23, wherein said deletion means can collectively delete specific personal data from said personal data stored in said memory means independently of the attitude of said device at a time when said device is in a predetermined attitude.

25. A line of sight detection device for detecting a line of sight of a user by using personal data of the user, said device comprising:

a) personal data obtaining means for obtaining personal data related to the line of sight of said user;

b) attitude detection means for detecting an attitude of said device; and c) determination means for comparing the attitude of said device when said personal data obtaining means initiates the operation for obtaining the personal data with the attitude of said device when said personal data obtaining means is obtaining the personal data, and for outputting information indicating a failure of obtaining the personal data when the attitude obtained during the personal data obtaining operation being performed is different from the attitude obtained when the personal data obtaining operation is initiated.

26. A device according to claim 25, wherein said personal data obtaining means includes light-receiving means for receiving an image of an eyeball of said user, so that the personal data related to the line of sight of said user is obtained by detecting an optical axis of the eyeball of said user based on the received image of the eyeball.

27. A device according to claim 26, wherein said personal data obtaining means obtains the personal data based on a gap between the optical axis of the eyeball of said user and the line of sight of said user.

28. A line of sight detection device for detecting a line of sight of a user by using personal data of the user, said device comprising:
   a) display means for indicating a plurality of indexes at different position of a view field of the user in order to obtain personal data related to the line of sight of said user;
   b) personal data obtaining means for obtaining the personal data related to the line of sight of said user based on a state of an eyeball of said user at a time when said user looks at said indexes;
   c) attitude detection means for detecting an attitude of said device; and
   d) determination means for outputting information indicative of a failure of obtaining the personal data when a first attitude obtained when the user looks at a first index among said plurality of indexes is different from a second attitude when the user looks at a second index.

29. A device according to claim 28, wherein said personal data obtaining means includes light-receiving means for receiving an image of an eyeball of said user, so that the personal data related to the line of sight of said user is obtained by detecting an optical axis of the eyeball of said user based on the received image of the eyeball.

30. A device according to claim 29, wherein said personal data obtaining means obtains the personal data based on a gap between the optical axis of the eyeball of said user and the line of sight of said user.

31. A line of sight detection device for detecting a line of sight of a user by using personal data of the user, said device comprising:
   a) personal data obtaining means for obtaining the personal data related to the line of sight of the user;
   b) attitude detection means for detecting an attitude of said device; and
   c) determination means for determining whether the attitude of said device detected by said attitude detection means changes during the personal data obtaining operation by said personal data obtaining means, and for outputting information indicative of a failure of the obtaining operation of the personal data when said attitude detection means detects the changing of the attitude of said device.

32. A line of sight detection device according to claim 31, wherein said personal data obtaining means comprises light receiving means for receiving an image of an eyeball of the user, so that the personal data related to the line of sight of the user is obtained by detecting an optical axis of the eyeball of the user based on the received image of the eyeball.

33. A line of sight detection device according to claim 32, wherein said personal data obtaining means obtains the personal data based on a gap between the optical axis of the eyeball of the user and the line of sight the user.

34. A line of sight detection device according to claim 31, wherein the failure of the operation for obtaining the personal data is notified to the user when said determination means determines that the attitude of said device has changed.

35. A line of sight detection device according to claim 31, further comprising indicating means for indicating to the user the failure of the operation for obtaining the personal data when said determination means determines that the attitude of said device has changed.

* * * * *

UNITED STATES PATENT AND TRADEMARK OFFICE
CERTIFICATE OF CORRECTION

PATENT NO. : 5,887,200

DATED : March 23, 1999

INVENTOR(S) : Keisuke AOYAMA

It is certified that error appears in the above-identified patent and that said Letters Patent is hereby corrected as shown below:

COLUMN 3:

Line 19, "is" should read --is not--.

COLUMN 9:

Line 56, "to of an" should read --of an--.

COLUMN 14:

Line 66, "a" should read --an--.

UNITED STATES PATENT AND TRADEMARK OFFICE
CERTIFICATE OF CORRECTION

PATENT NO. : 5,887,200

DATED : March 23, 1999

INVENTOR(S) : Keisuke AOYAMA

It is certified that error appears in the above-identified patent and that said Letters Patent is hereby corrected as shown below:

<u>COLUMN 16</u>:

Line 61, "the all" should read --the--.

Signed and Sealed this

Tenth Day of October, 2000

*Attest:*

Q. TODD DICKINSON

*Attesting Officer*   *Director of Patents and Trademarks*